(12) United States Patent
Shiono et al.

(10) Patent No.: US 6,414,930 B1
(45) Date of Patent: Jul. 2, 2002

(54) OPTICAL HEAD

(75) Inventors: Teruhiro Shiono, Osaka; Keiichi Matsuzaki, Ikeda; Tetsuo Saimi, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/366,625

(22) Filed: Aug. 3, 1999

(30) Foreign Application Priority Data

Aug. 3, 1998 (JP) .......................................... 10-219289

(51) Int. Cl.$^7$ ................................................. G11B 7/12
(52) U.S. Cl. .............................. 369/112.03; 369/112.01; 369/44.12; 369/112.07
(58) Field of Search ...................... 369/112.01, 112.03, 369/112.04, 112.05, 112.09, 112.28, 109.01, 109.02, 44.12, 44.23, 44.25, 44.37

(56) References Cited

U.S. PATENT DOCUMENTS

| 5,488,592 A | * | 1/1996 | Kim | ........................... 369/13 |
| 5,629,799 A | | 5/1997 | Maruyama et al. | |
| 5,796,520 A | | 8/1998 | Maruyama | |
| 5,838,497 A | | 11/1998 | Maruyama | |
| 5,883,744 A | | 3/1999 | Maruyama | |
| 6,172,958 B1 | * | 1/2001 | Mochizuki et al. | .. 369/44.37 X |
| 6,327,238 B1 | | 12/2001 | Nishiwaki et al. | |

FOREIGN PATENT DOCUMENTS

| JP | 6-242373 | 9/1994 |
| JP | 9-235023 | 8/1997 |

* cited by examiner

Primary Examiner—Muhammad Edun
(74) Attorney, Agent, or Firm—Ratner & Prestia

(57) ABSTRACT

To provide a thin optical head including a diffractive optical element 5 and refractive optical element 9 having an optical plane into which the optical axis of light 2 emitted from a light source 1 diagonally comes in the optical path between the light source 1 and an information recording medium 11 and constituted so that the change of diffraction angles of the diffracted light emitted from the diffractive optical element 5 due to the wavelength fluctuation of the emitted light 2 and the change of refraction angles of the refracted light emitted from the refractive optical element 9 are produced so as to be canceled.

26 Claims, 19 Drawing Sheets

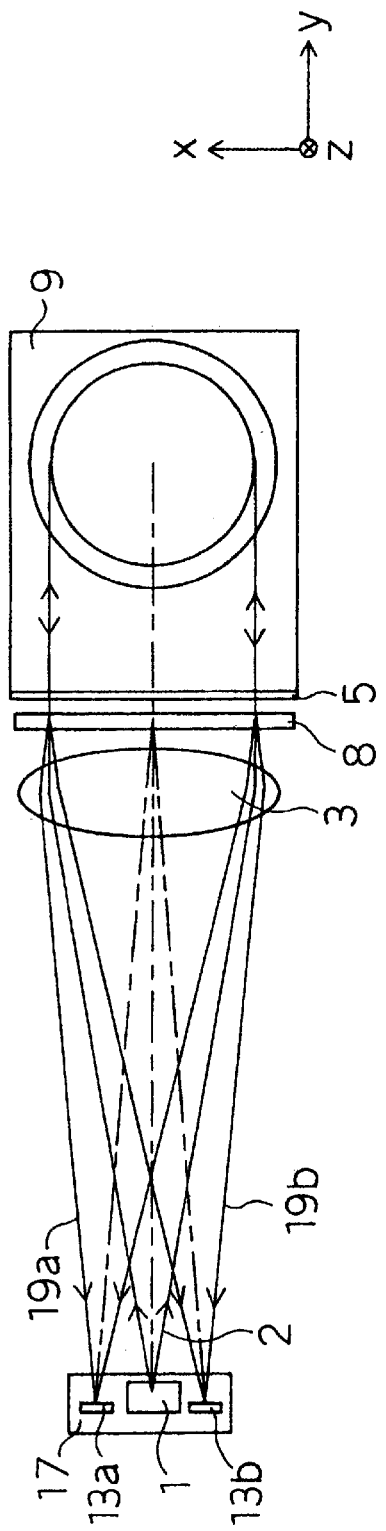
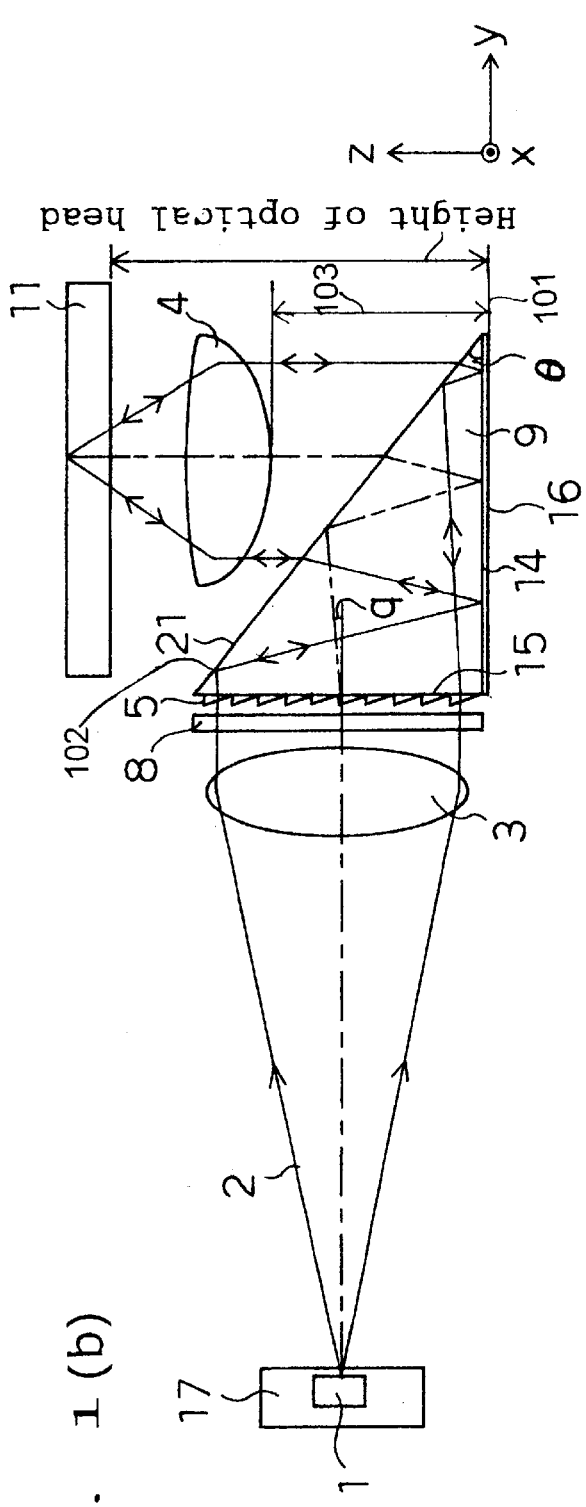
Fig. 1(a)
Fig. 1(b)

$(\lambda_1 > \lambda_2)$

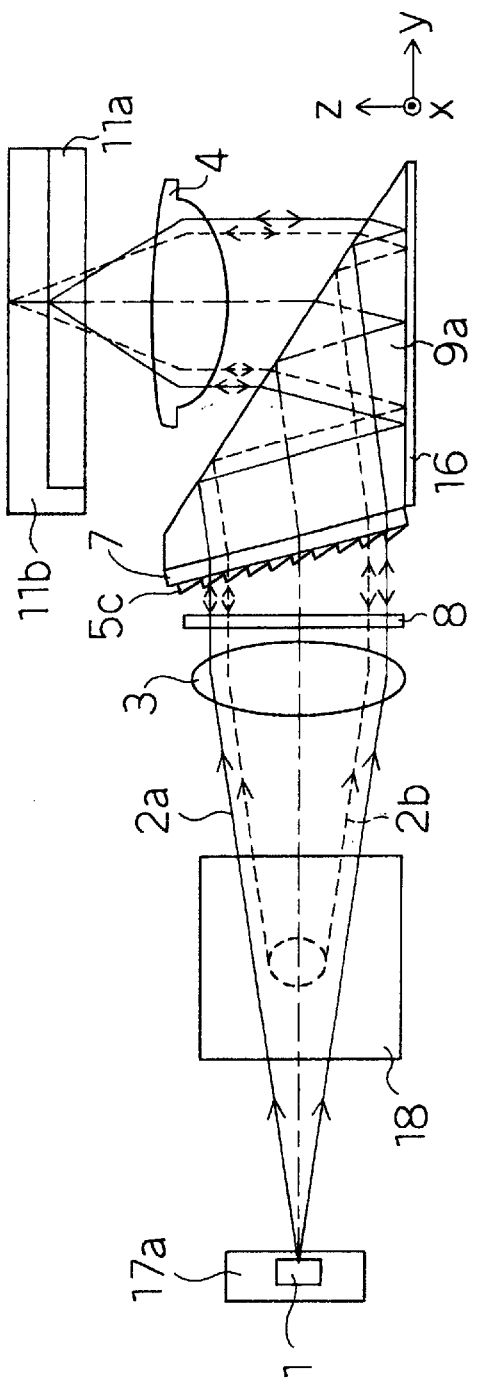
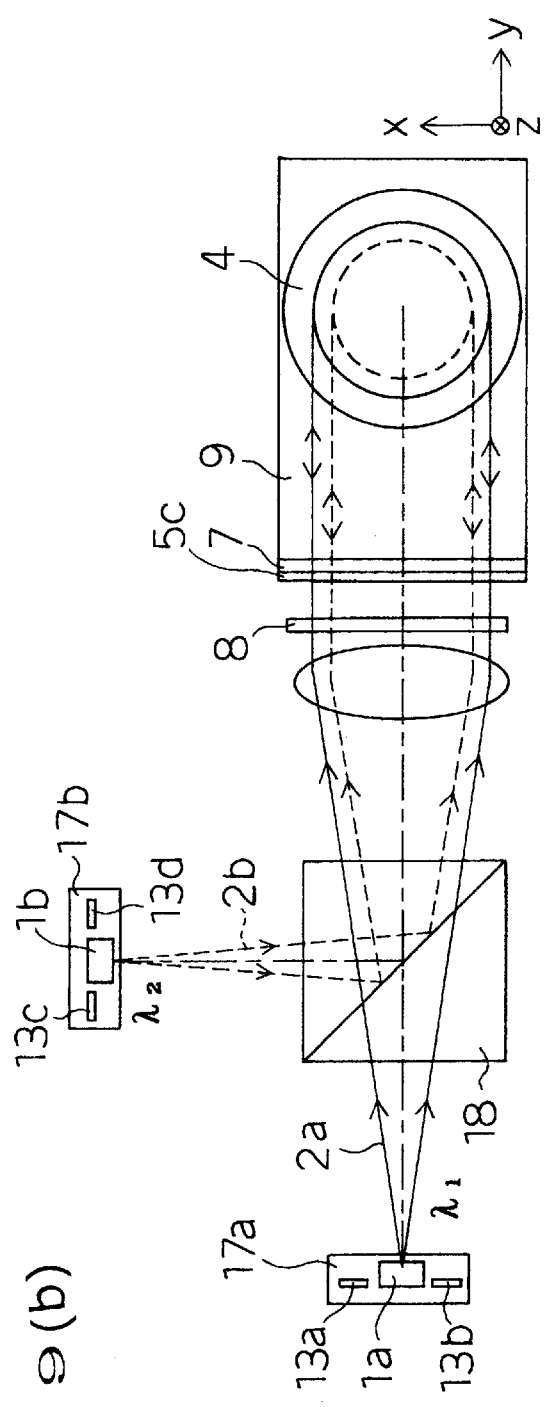
Fig. 9(a)
Fig. 9(b)

Diffraction efficiency of blazed grating

Diffraction efficiency of 8-level grating

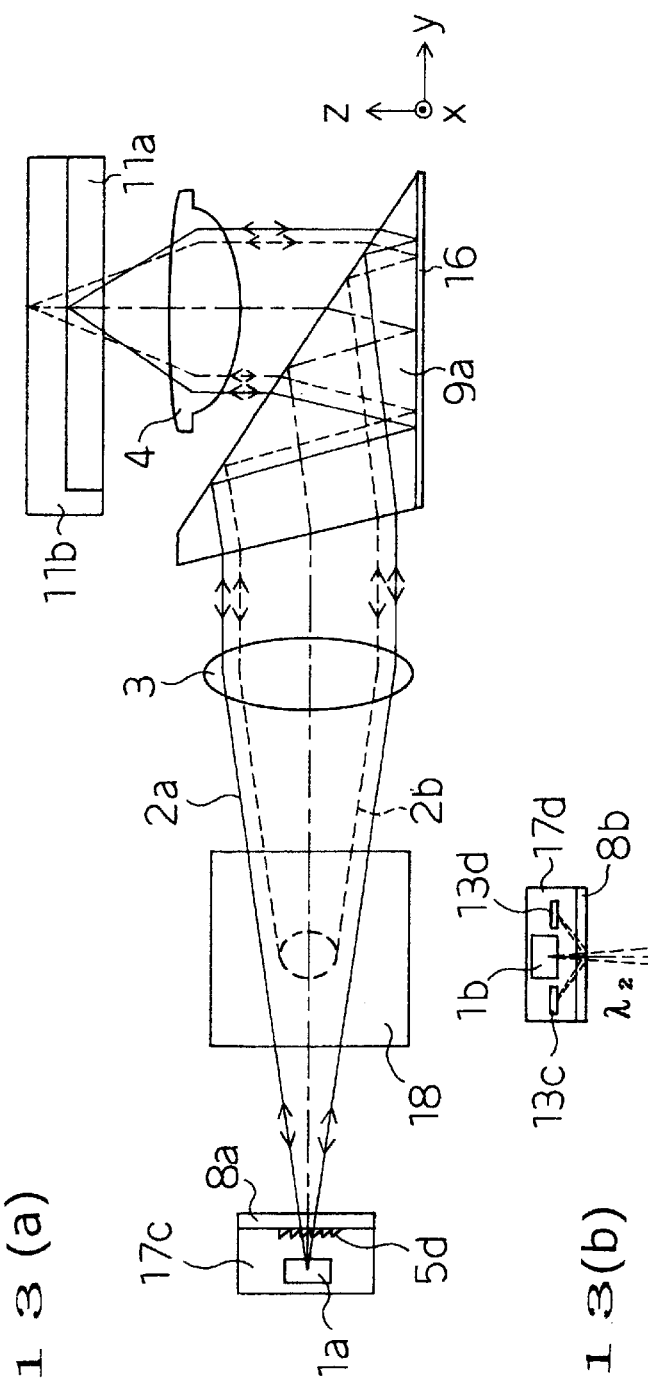
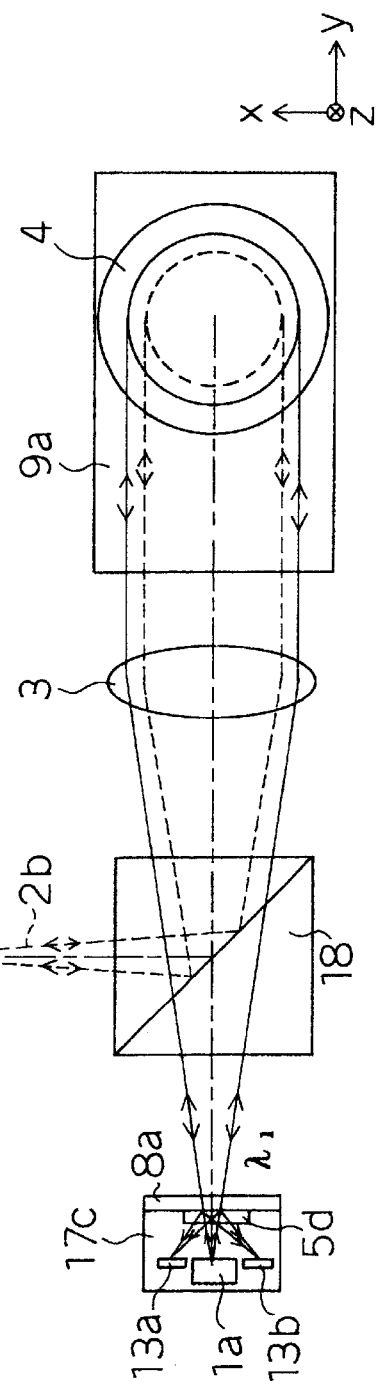
Fig. 13(a)
Fig. 13(b)

OPTICAL HEAD

BACKGROUND OF THE INVENTION

1. Field of the Invention

The present invention relates to an optical head of an optical recording/reproducing apparatus, particularly to a thin optical head having preferable optical characteristics.

2. Description of the Related Art

An optical head is used as an important component for reading a signal from an optical recording medium such as an optical disk or optical card memory, that is, a compact disk (CD) or DVD. It is preferable that an optical head is provided with not only a signal detecting function but also a control mechanism such as a focus servo or tracking servo in order to fetch a signal from an optical recording medium.

FIG. 19 shows a conventional typical optical head. As shown in FIG. 19, a laser beam 2 emitted from a semiconductor laser 1 serving as a light source is changed to parallel rays by a collimator lens 3, passes through a focus/track error signal detecting optical element 8 constituted of a holographic optical element, then the optical axis of the light is bent up to 90° and the light enters an objective lens 4. The laser beam 2 condensed on an optical disk 11 by the objective lens 4 is reflected and goes back through the original optical path, changed to parallel rays by the objective lens 4, and reflected by a mirror 20 to enter the focus/track error signal detecting optical element 8. The laser beam 2 entering the focus/track error signal detecting optical element 8 is divided in the element 8 and condensed on a photodetector. Thereby, a reproduced signal and focus and track error signals serving as servo signals are read.

As shown in FIG. 19, the height of the optical head is shown by the sum of a WD (working distance), thickness of the objective lens 4, space from the bottom face of the objective lens 4 up to the top of the mirror 20, and height of the mirror 20.

To decrease the height of an optical head, the minimum value of the sum of the WD, lens thickness, and space is almost determined by the type of the optical disk 11. In the case of a DVD, even if respectively setting the WD, lens thickness, and space to a minimum value of 1.1 mm, it is necessary to set the height of the mirror 20 to a value larger than a beam diameter, that is, it is necessary to set the height to at least 3 mm. Therefore, in this case, the height of the optical head is estimated as at least 6.3 mm and thus, it is difficult to further decrease the height of an optical head.

SUMMARY OF THE INVENTION

The present invention is made to solve the above problems of the prior art and its object is to provide an optical head which can be decreased in thickness and which has preferable optical characteristics.

One aspect of the present invention is an optical head comprising:

a diffractive optical element set in the optical path between a light source and an information recording medium; and refractive optical means which is set in the optical path and into which the optical axis of the light emitted from the light source diagonally comes; wherein diffraction angle change of the diffracted light emitted from the diffractive optical element due to the wavelength fluctuation of the emitted light and refraction angle change of the refracted light emitted from the refractive optical means occur in the direction in which the diffraction angle change and refraction angle change are canceled.

For example, when using a semiconductor laser beam-making it possible to constitute a thin optical head and serving as the light emitted from a light source, it is possible to obtain a preferable condensed spot on an optical disk surface even if central wavelengths of the emitted light are changed due to spread of a wavelength band of approx. 2 nm due to a high-frequency superimposition module or change of environmental temperatures.

Another aspect of the present invention is an optical head, wherein the diffractive optical element is integrated with the refractive optical means.

Thereby, for example, the structure is stabilized and alignment is easily made.

Still another aspect of the present invention is an optical head, wherein collimator means is included which changes the light emitted from the light source substantially to parallel rays and makes the parallel rays enter the diffractive optical element.

Thereby, for example, the diffraction efficiency and diffraction-angle change value of the light coming into a diffractive optical element become equal over the entire surface.

Yet another aspect of the present invention is an optical head, wherein a focus/track error signal detecting optical element is set between the light source and the refractive optical means and the diffractive optical element is integrated with the focus/track error signal detecting optical element.

Thereby, for example, the structure is stabilized and alignment is easily made.

Still yet another aspect of the present invention is an optical head, wherein the diffractive optical element is a uniform-period grating.

Thereby, for example, a diffractive optical element is easily aligned or fabricated.

A further aspect of the present invention is an optical head, wherein the diffractive optical element is set in a convergence-light optical path or divergence-light optical path, and the period of the diffractive optical element differs depending on places in accordance with the convergent degree or divergent degree of the light coming into the diffractive optical element.

"A still further aspect" of the present invention is an optical head, wherein the period is adjusted so as to be further lengthened substantially from the central portion toward the circumferential portion of the diffractive optical element.

Thereby, for example, it is possible to accurately uniform the diffraction angle change value of the diffracted light emitted from a diffractive optical element over the entire surface.

A yet further aspect of the present invention is an optical head, wherein the diffractive optical element is set in a convergent-light optical path or divergent-light optical path having a numerical aperture of 0.39 or less and the period of the diffractive optical element is uniform.

Thereby, for example, a diffractive optical element is easily aligned or fabricate.

A still further aspect of the present invention is an optical head, wherein the diffractive optical element is set in an optical path nearby the light source.

Thereby, for example, it is possible to decrease the area and the cost of a diffractive optical element.

One aspect of the present invention is an optical head, wherein the refractive optical means is an optical element having three planes for receiving or reflecting light and the diffractive optical element is formed on at least one of the three planes of the refractive optical means.

Thereby, for example, the structure is stabilized and alignment is easily made.

Another aspect of the present invention is an optical head, wherein the diffractive optical element is the reflective type and is formed on the reflective plane of the refractive optical means.

Thereby, for example, the diffraction efficiency of a diffractive optical element is improved.

Still another aspect of the present invention is an optical head, wherein the refractive optical means is a prism made of low-dispersion transparent material having three planes for receiving or reflecting light.

Yet another aspect of the present invention is an optical head, wherein the transparent material has an Abbe number of 50 or more.

Thereby, for example, because the period of a diffractive optical element is lengthened, the element is easily fabricated, a high diffraction efficiency is obtained, and it is possible to cancel influences of wavelength fluctuation in a wide wavelength region.

Still yet another aspect of the present invention is an optical head, wherein
  the refractive optical means is a prism made of transparent material having a refractive index n, and
  one of the base angles of the prism is substantially a right angle and the other θ of the base angles has an angle θ substantially meeting $\theta = n \cdot \sin(3\theta - 90°)$.

Thereby, for example, it is possible to make the optical axis of the light coming into refractive optical means almost perpendicular to that of the light emitted from the refractive optical means.

A further aspect of the present invention is an optical head, wherein
  the refractive optical means is a prism made of transparent material having a refractive index n, and
  one θ of the base angles of the prism substantially meets $\sin(2\theta - 45°) = 1/n \cdot \sin \theta$ and the other $\theta_1$ of the base angles meets $\theta + 85° \leq \theta_1 \leq \theta + 95°$.

Thereby, for example, it is possible to make the beam diameter of the light coming into refractive optical means almost equal to that of the light emitted from the refractive optical means and make optical axes of the former and latter lights almost perpendicular to each other.

A still further aspect of the present invention is an optical head, wherein the light source has a plurality of light-source sections for emitting wavelengths different from each other.

Thereby, for example, it is possible to correspond to a plurality of types of information recording media.

A yet further aspect of the present invention is an optical head, wherein the diffractive optical element is set only to an optical path nearby a light-source section for emitting minimum-wavelength light among the light-source sections.

Thereby, for example, it is possible to decrease the cost and optimize the optical characteristic of a short wavelength most subject to wavelength fluctuation.

A still yet further aspect of the present invention is an optical head, wherein
  the diffractive optical element has a blazed sectional form, and
  when assuming the minimum value of the different wavelengths as $\lambda_1$ and the maximum value of them as $\lambda_2$ and the refractive index of the diffractive optical element as n, the groove depth L of the diffractive optical element meets the relation of $\lambda_1/(n-1) \leq L \leq \lambda_2/(n-1)$.

Thereby, for example, it is possible to raise the diffraction efficiency of a diffractive optical element for a plurality of wavelengths.

One aspect of the present invention is an optical head, wherein the groove depth L of the diffractive optical element is substantially equal to $(\lambda_1+\lambda_2)/[2(n-1)]$.

Thereby, for example, it is possible to raise the diffraction efficiency of a diffractive optical element for a plurality of wavelengths at the best balance.

Another aspect of the present invention is an optical head, wherein
  the sectional form of the diffractive optical element is a multilevel shape with p levels, and
  when assuming the minimum value of the different wavelengths as $\lambda_1$ and the maximum value of them as $\lambda_2$ and the refractive index of the diffractive optical element as n, the groove depth L of the diffractive optical element meets the relation of $(p-1) \cdot \lambda_1/[p \cdot (n-1)] \leq L \leq (p-1) \cdot \lambda_2/[p \cdot (n-1)]$.

Thereby, for example, it is possible to raise the diffraction efficiency of a diffractive optical element for a plurality of wavelengths.

Still another aspect of the present invention is an optical head, wherein the groove depth of the refractive optical element is substantially equal to $(p-1) \cdot (\lambda_1+\lambda_2)/[2p(n-1)]$.

Thereby, for example, it is possible to raise the diffraction efficiency of a diffractive optical element for a plurality of wavelengths at the best balance.

Yet another aspect of the present invention is an optical head, wherein
  the refractive optical element is a prism made of transparent material having a refractive index n, and
  when assuming a setting angle formed between the bottom face and the setting reference plane of the refractive optical means as $\theta_b$ and an angle formed between the light coming into the refractive optical means from the light source and the setting reference plane as $\theta_p$, one angle θ of the base angles of the prism substantially meets $\sin(\theta - \theta_b) = n \cdot \sin(4\theta - 2\theta_b - \theta_p - 90° - \theta')$ and $n \cdot \sin \theta' = \sin(\theta - \theta_b)$ and the other angle $\theta_1$ of the base angles substantially meets $\theta_1 = \theta + 90° - 2\theta_b - \theta_p$.

Still yet another aspect of the present invention is an optical head, wherein the $\theta_b$ substantially meets $2° \leq \theta_b \leq 10°$.

Thereby, for example, it is possible to further decrease the height of an optical head.

A further aspect of the present invention is an optical head, wherein
  the refractive optical means is a prism having three optical panes, and
  when assuming one of the three planes at the information recording medium side as a first plane, one of them at the light-source side as a second plane, and remaining one of them as a third plane, the light emitted from the light source passes through the second plane, reflects on the first and Thereby, for example, it is possible to decrease the height of an optical head in accordance with zigzag propagation of an optical path in a prism.

A still further aspect of the present invention is an optical head comprising refractive optical means provided with a prism having three optical planes in the optical path between a light source and information recording medium; wherein when assuming one of the three planes at the information recording medium side as a first plane, one of them at the light-source side as a second plane, and the remaining one of them as a third plane, the light emitted from the light source passes through the second plane, reflects on the first and third planes in order, and passes through the first plane.

Thereby, for example, it is possible to decrease an optical head in thickness.

A yet further aspect of the present invention is an optical head, wherein the wavelength $\lambda$ of the emitted light substantially meets $0.35\ \mu m \leq \lambda \leq 0.5\ \mu m$.

A still yet further aspect of the present invention is an optical head, wherein the third plane is parallel with the setting reference plane of the refractive optical means.

One aspect of the present invention is an optical head, wherein an objective lens is set in the optical path between the information recording medium and the refractive optical means, and the height of the uppermost portion of the emitted light passing through the second plane from the setting reference plane of the refractive optical means is higher than the height of the lowermost portion of the objective lens from the setting reference plane.

BRIEF DESCRIPTION OF THE DRAWINGS

FIG. 1($a$) is a top view showing the basic configuration and light propagation state of the optical head of the first embodiment of the present invention;

FIG. 1($b$) is a side view showing the basic configuration and light propagation state of the optical head of the first embodiment of the present invention;

FIG. 2($b$) is an illustration showing a state in which refracted light is produced when rays having different wavelengths enter the refractive optical element of the optical head of the first embodiment of the present invention;

FIG. 9($a$) is a side view showing the basic configuration and light propagation state of the optical head of the seventh embodiment of the present invention;

FIG. 9($b$), is a top view showing the basic configuration and light propagation state of the optical head of the seventh embodiment of the present invention;

FIG. 10($b$) is a graph showing the relation between diffraction efficiency and groove depth when using an eight-level grating having an eight-step cross section as the diffractive optical element of the optical head of the seventh embodiment of the present invention;

FIG. 13($a$) is a side view showing the basic configuration and light propagation state of the optical head of the ninth embodiment of the present invention;

FIG. 13($b$) is a top view showing the basic configuration and light propagation state of the optical head of the ninth embodiment of the present invention;

DESCRIPTION OF SYMBOLS

Figure 2A:
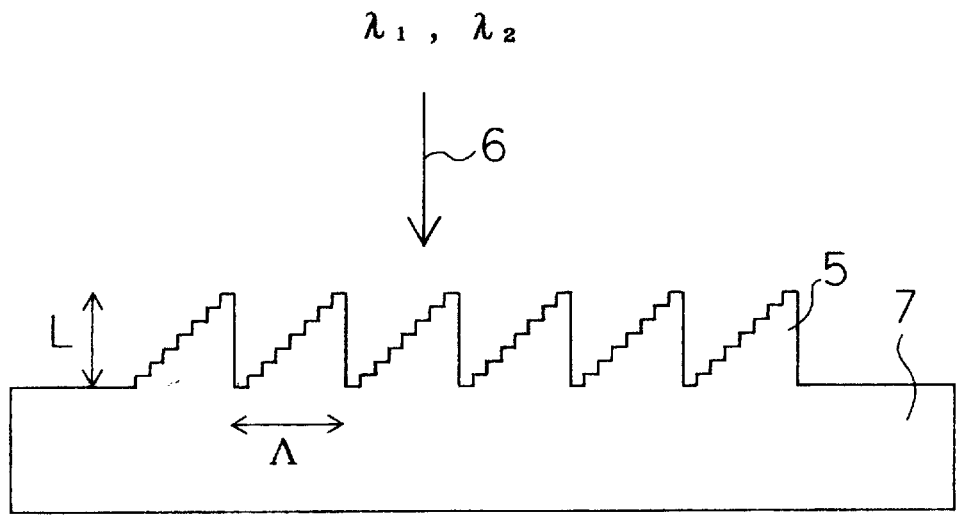
FIG. 2($a$) is an illustration showing a state in which diffracted light is produced when rays having different wavelengths enter the diffractive optical element of the optical head of the first embodiment of the present invention.

1 Light source
2 Emitted light
3 Collimator means
4 Objective lens
5 Diffractive optical element
6 Incident light
7 Substrate
8 Focus/track error signal detecting optical element
9 Refractive optical means
10 Diffracted light
11 Information recording medium
12 Refracted light
13 Photodetector
14 Bottom face of refractive optical means (Third plane)
15 Side face of refractive optical means (Second plane)
16 Reflection film 17 Light-source-and-photodetector unit
18 Beam splitter
19 Signal light
20 Mirror
21 Slope of refractive optical means (First plane)

DETAILED DESCRIPTION OF THE PREFERRED EMBODIMENTS

Embodiments of the present invention are described below referring to the accompanying drawings.

(First Embodiment)

The optical head of the first embodiment of the present invention is described below in detail by referring to FIG. 1(a) to FIG. 2(b) and setting coordinate axes as shown in FIGS. 1(a) to 2(b).

Figure 2B:
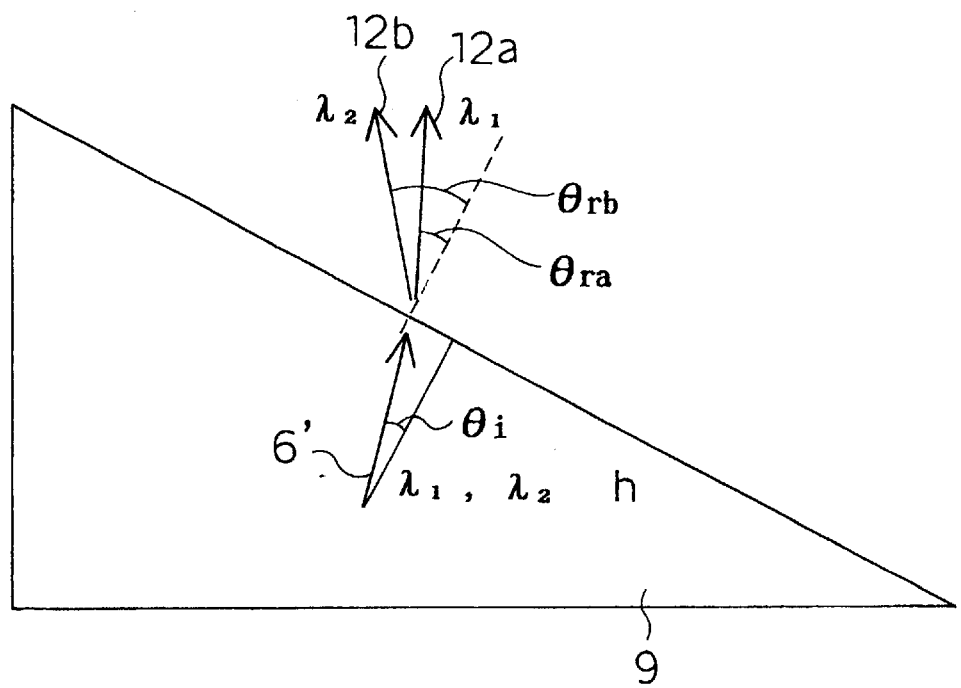

FIG. 1(a) is a top view showing the basic configuration and light propagation state of the optical head of the first embodiment of the present invention and FIG. 1(b) is a side view showing the basic configuration and light propagation state of the optical head of the first embodiment of the present invention. FIG. 2(a) is an illustration showing a state in which diffracted light is produced when rays having wavelengths different from each other enter the diffractive optical element of the optical head of the first embodiment and FIG. 2(b) is an illustration showing a state in which refracted light is produced when rays having wavelengths different from each other enter the refractive optical element of the optical head of the first embodiment, which are illustrations for explaining the operation principle for correction of chromatic aberration.

As shown in FIGS. 1(a) and 1(b), as for the optical head of this embodiment, a diffractive optical element 5 and a refractive optical means 9 having an optical plane 21 (corresponding to the first plane of the refractive optical means of the present invention) into which the optical axis of the light 2 emitted from a light source 1 diagonally comes are arranged in the optical path between the light source 1 and an optical disk 11 such as a DVD or CD serving as a recording medium. The right source 1 and photodetectors 13a and 13b are integrated in a light-source-and-photodetector unit 17.

The laser beam 2 having a wavelength of, for example, λ=0.658 μm emitted from a semiconductor laser serving as the light source 1 in y-axis direction is changed to almost parallel rays having a z-axis-directional beam diameter of 3.25 mm by a collimating lens 3, passes through a focus/track error signal detecting optical element 8 (using zero-order diffracted light), and enters a diffractive optical element 5 serving as a parallel grating having a uniform period Λ of, for example, 60.7 μm. The diffractive optical element 5 is integrally formed on the side face 15 (corresponding to the second plane of refractive optical means of the present invention) of a refractive optical element having, for example, three incident or reflective planes and serving as a prism whose one base angle θ is equal to 38° and whose other base angle is almost equal to a right angle as shown in FIGS. 1(a) and 1(b). The beam 2 is diffracted by the grating 5 only by an angle q=0.4° in z-axis direction from y-axis and total-reflected by the slope 21 of a prism 9. Thereafter, the beam 2 is further reflected by the bottom face 14 (corresponding to the third plane of refractive optical means of the present invention) with a reflection layer 16, diagonally enters the slope 21 at an angle of 24.4° from the normal line of the slope 21 and is refracted, and emitted in the vertical direction (z-axis direction) at a y-axis-directional beam diameter of 2.8 mm and condensed on the optical disk 11 by the objective lens 4.

The laser beam 2 reflected by the optical disk 11 is returned in the opposite direction, passes through the objective lens 4, prism 9, and grating 5 in order, and is divided by the focus/track error signal detecting optical element 8 (signal rays 19a and 19b using 1st-order diffracted light) and detected by the photodetectors 13a and 13b.

This embodiment uses a triangular prism made of transparent material (e.g. glass, resin, and so on) BK7 glass and having a height of 3.7 mm, a depth of 4 mm, and a width of 4.7 mm as the refractive optical means 9. Moreover, by using the configuration of reflecting light with the slope 21 and the bottom face 14 in the prism 9 and emitting it from the slope 21 where the optical axis becomes diagonal, the height of the uppermost portion (provided with symbol 102 in FIG. 1(b)) of the emitted light passing through the side face 15 from the setting reference plane 101 of the prism 9 (refractive optical means) becomes higher than the height 103 of the lowermost potion of the objective lens 4 from the setting reference plane 101. Therefore, it is possible to greatly decrease the height (e.g. up to 5.3 mm) of the optical head while keeping the function of the mirror of a conventional optical head.

Particularly, it is found by the present inventor et al. that, when the refractive index of transparent material is assumed as n, and one of base angles is almost equal to a right angle and the other θ of them almost met $\sin\theta = n \cdot \sin(3\theta - 90°)$, the optical axis of the light coming into the prism 9 is almost perpendicular to that of the light emitted from the prism 9. According to the above configuration, advantages are obtained that optical components are easily arranged and alignment is simplified. Moreover, by using the configuration in which the grating 5 is integrated with the vertical plane 15 of the prism 9, the structure is stabilized and alignment is further simplified because the prism 9 and the grating 5 can be handled as one component.

A uniform-period grating having a blazed cross section shown in FIGS. 1(a) and 1(b) or stepped (multilevel) uniform-period grating formed on a substrate 7 made of glass or the like shown in FIG. 2(a) is used as diffractive optical element 5 and the depth L of a groove is set to, for example, 1.29 μm (as for the blazed-sectional grating) or 1.13 μm (as for the eight-level grating) so that the 1st-order diffraction efficient is maximized. By using a uniform-period grating, an element can be easily fabricated and alignment in an optical system is simplified.

Moreover, the focus/track error signal detecting optical element 8 is a holographic optical element formed on a resin substrate, glass substrate, or LiNbO$_3$ crystal. Particularly, when using the LiNbO$_3$ crystal, an advantage is obtained that the light using efficiency can be improved by using a quarter-wavelength plate for the optical path between the focus/track error signal detecting optical element 8 and the optical disk 11.

Furthermore, by using the collimator lens 3 and making almost parallel rays enter the diffractive optical element 5, the diffraction efficiency and the diffraction-angle change value of the light coming into. the diffractive optical element 5 can be almost equalized over the entire light incoming region.

Then, the principle of the behavior of light waves when wavelength fluctuation occurs is described below by referring to FIGS. 2(a) and 2(b).

As shown in FIG. 2(a), when the light 6 having a wavelength of $\lambda_1$ enters the diffractive optical element 5, it is assumed that 1st-order diffracted light 10a is produced at a diffraction angle $\theta_{da}$. When wavelength fluctuation occurs and a wavelength decreases to $\lambda_2$, diffracted light 10b is produced at a diffraction angle $\theta_{db}$. As a result, a phenomenon occurs that the direction of emitted light differs depending on the wavelength fluctuation. This phenomenon is referred to as dispersion.

Moreover, as shown in FIG. 2(b), when light 61 having a wavelength $\lambda_1$ enters the prism 9 of the refractive optical element at an incident angle $\theta_i$ from a diagonal direction, refracted light 12a is produced at a refraction angle $\theta_{ra}$. When wavelength fluctuation occurs and, for example, a wavelength is shortened to $\lambda_2$, refracted light 12b is produced at a larger refraction angle $\theta_{rb}$. This is because the refractive index of the transparent material constituting the prism fluctuates. As a result, the phenomenon of dispersion in which directions of emitted light differ occurs.

Therefore, it is found that, by combining a diffractive optical element with a refractive optical element having an optical plane into which light diagonally comes, there is a condition in which dispersion phenomenon is canceled and directions of emitted light can be made constant independently of wavelength fluctuation because directions in which emitted light fluctuates are opposite each other to wavelength fluctuation in the both elements.

In the case of this embodiment, because, for example, $\theta_i$ is equal to 24.4° in a prism, a refraction angle increases by 0.001888° because the refractive index n of the prism changes from 1.514264955 to 1.514327214 when a wavelength $\lambda$ is shortened by, for example, 2 nm from 0.658 $\mu$m. However, when the light 6 enters a diffractive optical element having a period $\Lambda$ of 60.7 $\mu$m, a diffraction angle decreases by 0.001888° when a wavelength decreases by 2 nm. Therefore, it is found that the influence of wavelength fluctuation is canceled by combining them. Therefore, the optical axis of the light emitted to the objective lens 4 is constant independently of wavelength fluctuation and an advantage of forming a preferable spot free from chromatic aberration on the optical disk 11 is obtained.

Moreover, a case is described above in which a wavelength $\lambda$ is shortened by 2 nm from 0.658 $\mu$m. In general, however, the light source 1 spreads by approx. ±1 nm (wavelength width of 2 nm) from the central wavelength due to high-frequency superposition even if there is no temperature change. Even if there is the above wavelength spread, it is possible to cancel chromatic dispersion by combining the prism 9 with the grating 5 as described above.

In this case, however, even though chromatic dispersion can be completely canceled when a wavelength is equal to a central wavelength (designed wavelength) of $\lambda$=0.658 $\mu$m, it is also found that chromatic dispersion slowly occurs when wavelength fluctuation due to temperature change further occurs (when deviated from the central wavelength).

It is found by the present inventor et al. that the color-dispersion appearing rate is decreased due to the above temperature change as the transparent material constituting the prism 9 has a lower dispersion characteristic. Moreover, at the same time, it is found that the period of the diffractive optical element 5 for correcting chromatic aberration can be larger when the transparent material constituting the prism 9 has a lower dispersion characteristic. In this case, there are advantages that the diffractive optical element 5 is easily fabricated and a high diffraction efficiency is obtained.

As a result of more minute study, it is found that, because wavelength fluctuation due to temperature change is practically kept in a range of ±20 nm, the lateral spread of a spot condensed by an objective lens due to chromatic aberration is kept at a level having no problem in practical use because the wave-front aberration becomes 70 m$\lambda$ or less when the transparent material of the. prism 9 has an Abbe number of 50 or more and a signal can be preferably reproduced from the optical disk 11. Therefore, it is preferable to use one of BK7 glass (Abbe number of 64.2), FC5, FK5, FCD1, FCD10, FCD100, VC79 (Abbe number of 57), and P-BK40 (Abbe number of 64) as the transparent material of the prism 9.

(Second Embodiment)

The optical head of the second embodiment of the present invention is described below mainly on points different from the case of the first embodiment by referring to FIG. 3.

Figure 3:
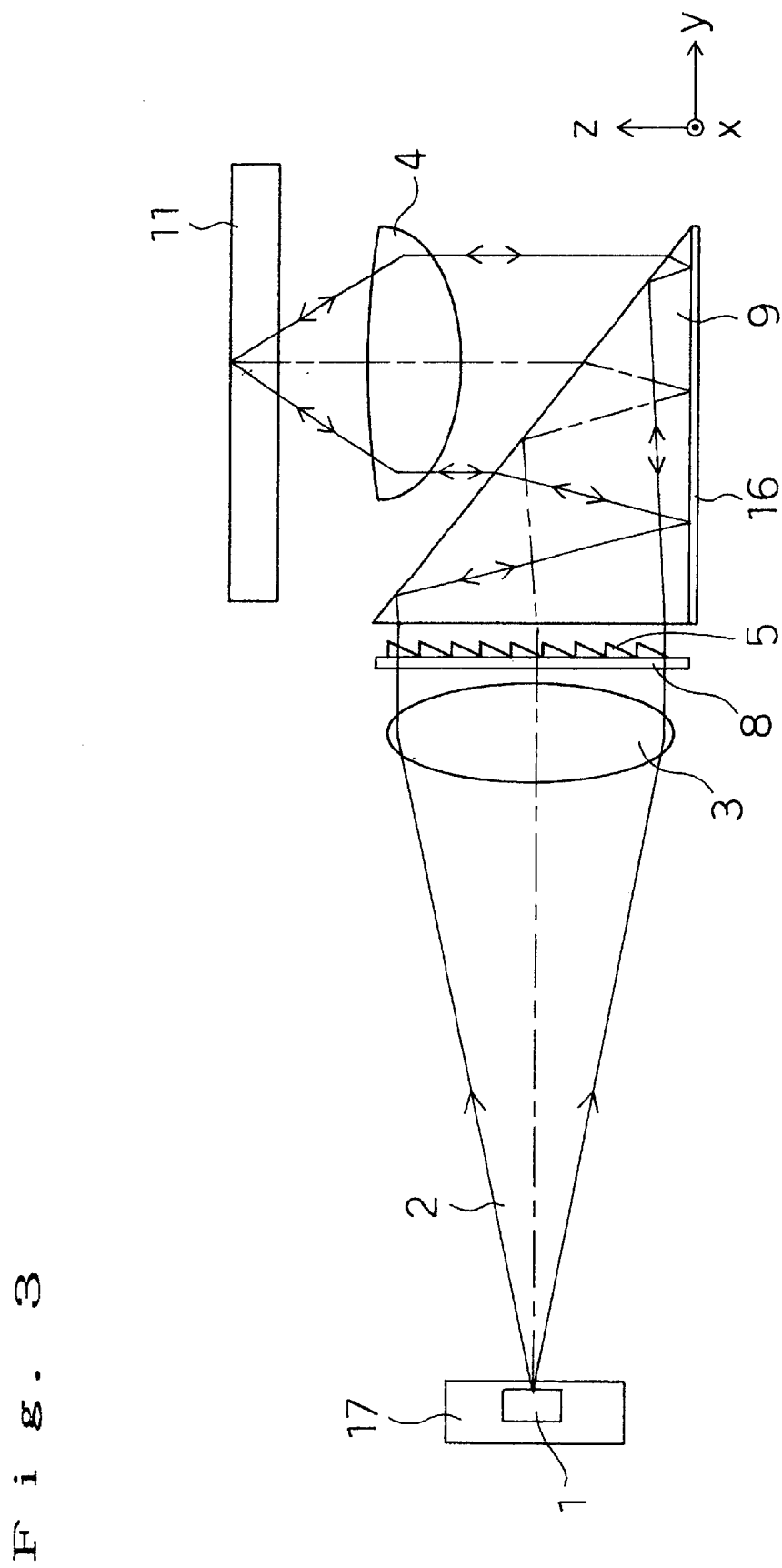
FIG. 3 is a side view showing the basic configuration and light propagation state of the optical head of the second embodiment of the present invention.

FIG. 3 is a side view showing the basic configuration and light propagation state of the optical head of the second embodiment of the present invention.

As shown in FIG. 3, in the case of this embodiment, the diffractive optical element 5 is set in the optical path between the collimating lens 3 and the refractive optical means 9 integrally with the focus/track error signal detecting optical element 8. By integrating the focus/track error signal detecting optical element 8 with the diffractive optical element 5, the structure is stabilized, thereby, they can be handled as one component, and alignment is easily made.

As shown in FIG. 3, it is also possible to set the diffractive optical element 5 to the surface or the back of the focus/track error signal detecting optical element 8. Moreover, it is possible to integrate a substrate on which the diffractive optical element 5 is formed with the focus/track error signal detecting optical element 8. Furthermore, it is possible to form the surface of the focus/track error signal detecting optical element 8 as the diffractive optical element 5.

(Third Embodiment)

The optical head of the third embodiment of the present invention is described below mainly on points different from the case of the first embodiment by referring to FIG. 4.

Figure 4:
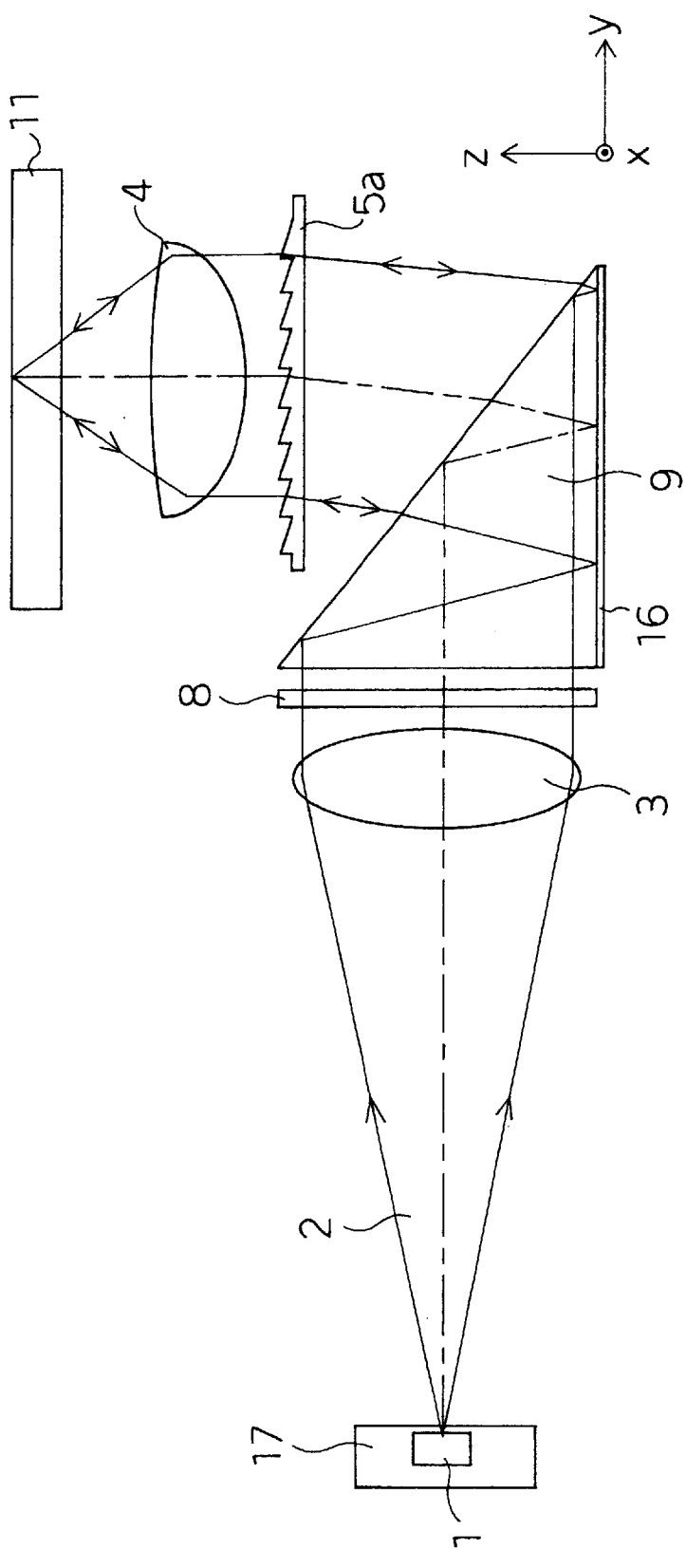
FIG. 4 is a side view showing the basic configuration and light propagation state of the optical head of the third embodiment of the present invention.

FIG. 4 is a side view showing the basic configuration and light propagation state of the optical head of the third embodiment of the present invention.

As shown in FIG. 4, in the case of this embodiment, a diffractive optical element 5a is set in the optical path of almost parallel rays between refractive optical means 9 and an objective lens 4. By setting the element 5a as described above, the distance between the diffractive optical element 5a and a light-source-and-photodetector unit 17 is increased, it is possible to make arrangement so that diffracted light (unnecessary light) other than 1st-order diffracted light does not enter the photodetector, and thereby an advantage is obtained that the S/N of detected light is improved.

Moreover, it is possible to turn the relief shape of the diffractive optical element 5a toward the objective lens 4 or in the direction opposite to the objective lens 4.

(Fourth Embodiment)

The optical head of the fourth embodiment of the present invention is described below mainly on points different from the case of the first embodiment by referring to FIG. 5.

Figure 5:
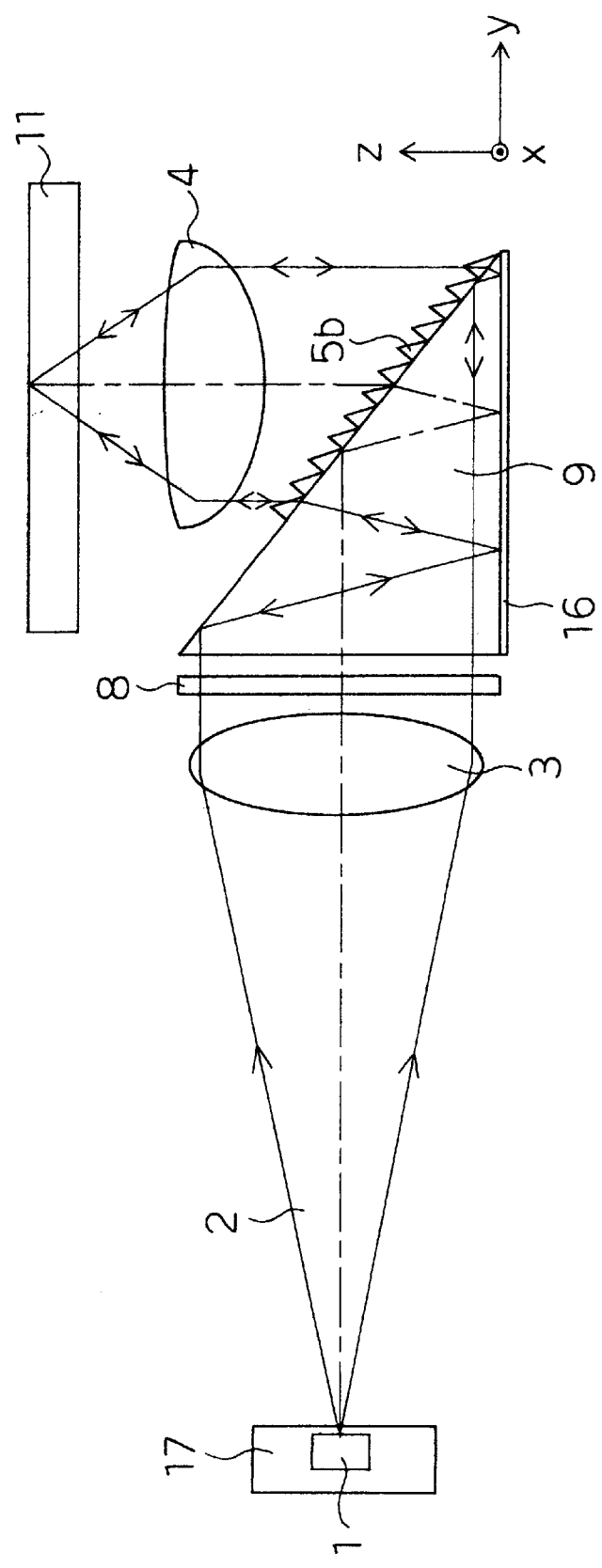
FIG. 5 is a side view showing the basic configuration and light propagation state of the optical head of the fourth embodiment of the present invention.

FIG. 5 is a side view showing the basic configuration and light propagation state of the optical head of the fourth embodiment of the present invention.

As shown in FIG. 5, in the case of this embodiment, a diffractive optical element 5b is set in the optical path of almost parallel rays between refractive optical means 9 and an objective lens 4 integrally with the slope of a right-triangle prism serving as the refractive optical means 9. By setting the diffractive optical element 5b as described above, advantages are obtained that the distance between the diffractive optical element 5b and a light-source-and-photodetector unit 17 provided with a photodetector is increased, the photodetector can be set so that diffracted light (unnecessary light) other than 1st-order diffracted light produced by the diffractive optical element 5b does not enter the photodetector, and the S/N of detected light is improved. Moreover, by integrating the element 5b with the means 9, the structure is stabilized and they can be handled as one component and thus, alignment can be easily made.
(Fifth Embodiment)

The optical head of the fifth embodiment of the present invention is described below mainly on points different from the case of the first embodiment by referring to FIG. 6.

Figure 6:
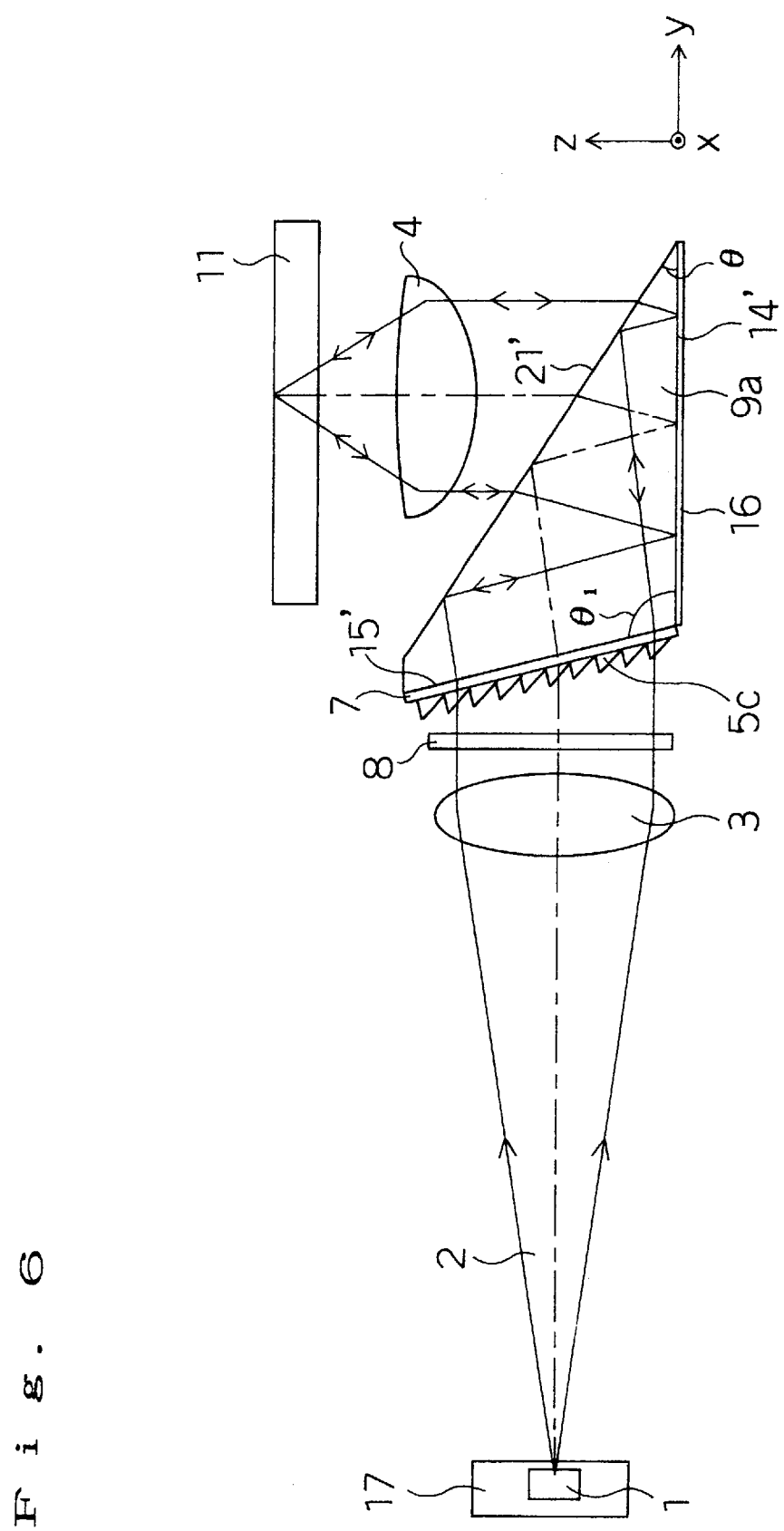
FIG. 6 is a side view showing the basic configuration and light propagation state of the optical head of the fifth embodiment of the present invention.

FIG. 6 is a side view showing the basic configuration and light propagation state of the optical head of the fifth embodiment of the present invention.

The optical system of each of the first to fourth embodiments uses an optical system in which only the diameter of z-axial beam of rays made almost parallel by the collimator lens 3 is decreased to 0.86 times (but the diameter of x-axial beam is not changed) and enters the objective lens 4.

The optical system of this embodiment is an optical system in which beam diameters of rays made parallel by the collimator lens 3 enter the objective lens 4 while beam diameters of the rays are almost equal in z- and x-axis directions.

In FIG. 6, refractive optical means 9a is, for example, a prism made of BK7 glass, in which the base angle θ formed between a bottom face 14' and a slope 21' is equal to, for example, 33° and the base angle $\theta_1$ formed between the bottom face 14' and a side face 15' is equal to 121.6°. A diffractive optical element 5c is, for example, formed on a glass substrate 7 and integrated with the side face 15' of the prism 9a. By using the integrated configuration, the structure is stabilized and they can be handled as one component. Therefore, alignment can be easily made.

It is found by the present inventor et al. that, when using a prism made of transparent material having a refractive index n as refractive optical means, one base angle formed between the bottom face 14' and the side face 15' is equal to a angle θ almost meeting an equation $\sin(2\theta-45°)=1/n\cdot\sin\theta$ and the other base angle formed between the bottom face 14' and the side face 15' is equal to an angle $\theta_1$ meeting an inequality $\theta+85°\leq\theta_1\leq\theta+95°$, optical axes can be made almost perpendicular to each other while beam diameters of the light coming into the prism 9a and the light emitted from the prism 9a are kept almost equal to each other (with no beam shaping) According to the above configuration, advantages are obtained that optical components can be easily arranged and alignment can be simplified.

In the case of this embodiment, optical planes into which the optical axis of light diagonally comes include the slope 21' and the side face 15' and dispersion due to refraction synthetically increases compared to the cases of embodiments 1 to 5. Therefore, as for this embodiment, the diffractive optical element 5c for correcting chromatic dispersion of refraction uses a uniform-period grating having a period 39.7 μm. Thus, by making the period of this embodiment smaller than the period 60.7 μm of the diffractive optical element described for the above embodiments, it is possible to increase the dispersion of diffraction. Thereby, it is possible to cancel dispersion due to refraction.
(Sixth Embodiment)

The optical head of the sixth embodiment of the present invention is described below main on points different from the case of the fifth embodiment by referring to FIGS. 7 and 8.

Figure 7:
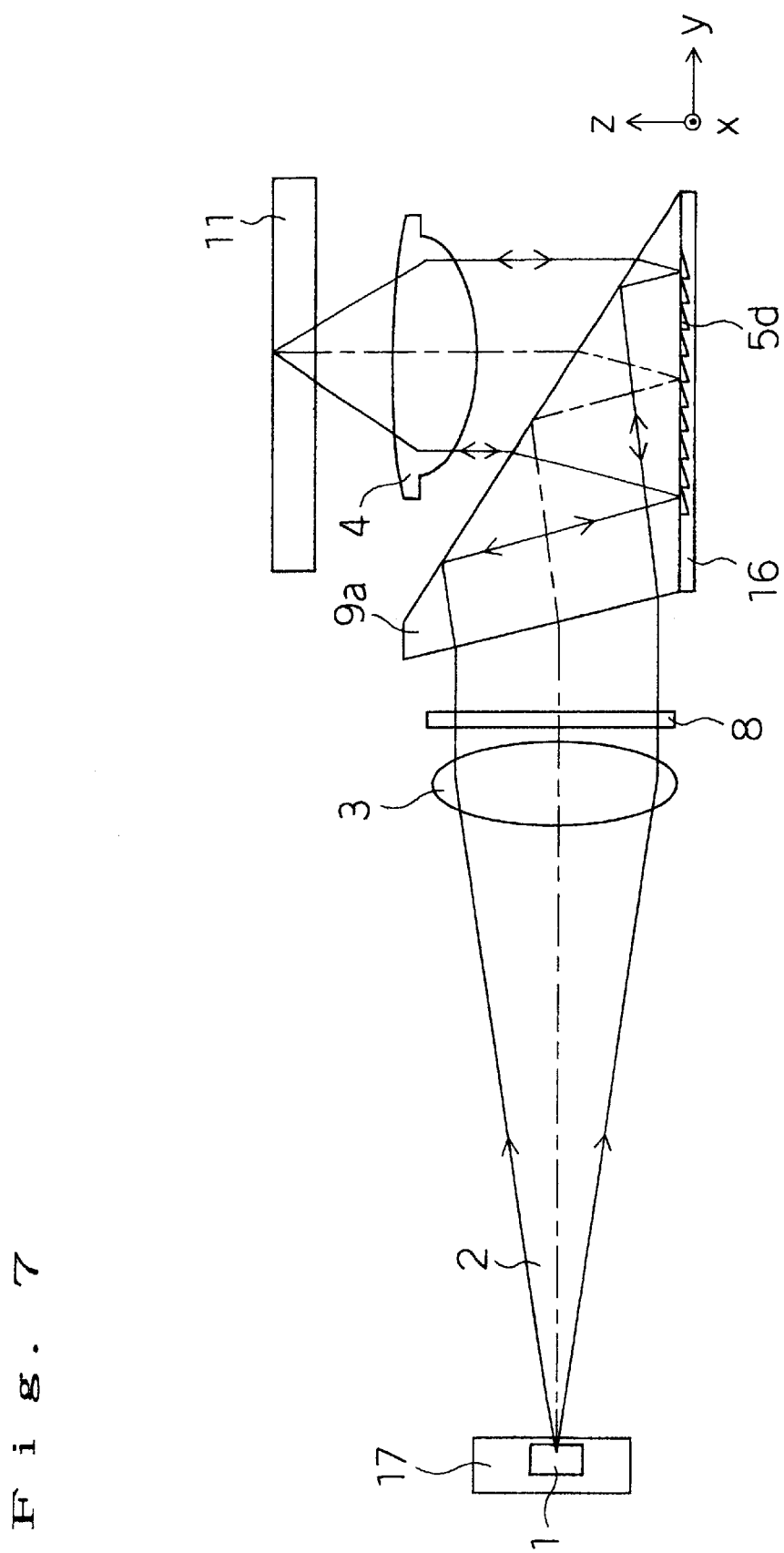
FIG. 7 is a side view showing the basic configuration and light propagation state of the optical head of the sixth embodiment of the present invention.
Figure 8:
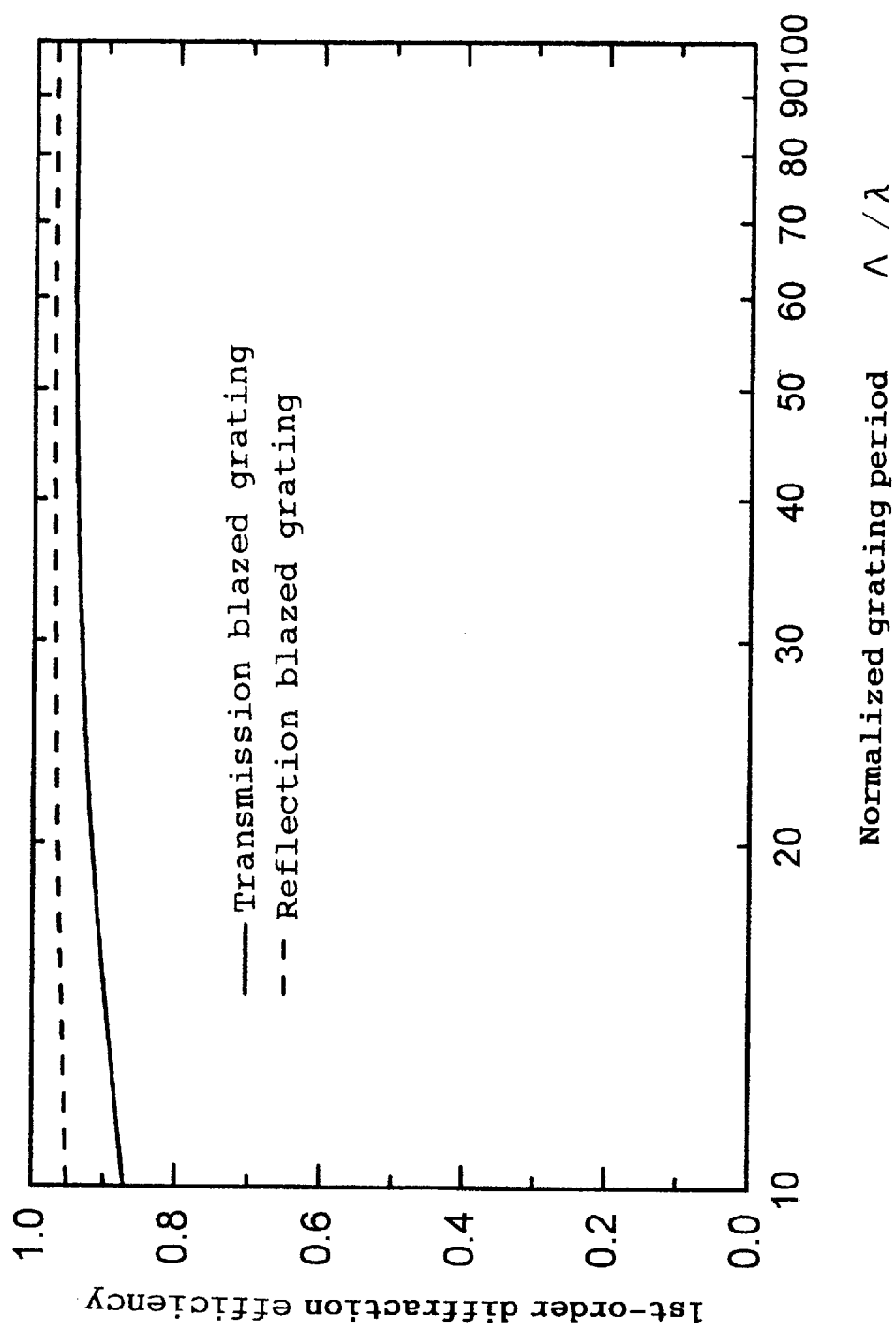
FIG. 8 is an illustration showing the 1st-order diffraction efficiency of the diffractive optical element (reflection grating) of the optical head of the sixth embodiment of the present invention and the 1st-order diffraction efficiency of the diffractive optical element (transmission grating) of the fifth embodiment of the present invention.

FIG. 7 is a side view showing the basic configuration and light propagation state of the optical head of the sixth embodiment of the present invention and FIG. 8 is an illustration showing the 1st-order diffraction efficiency (broken line) of the diffractive optical element (reflection grating) of the optical head of the sixth embodiment of the present invention and the 1st-order diffraction efficiency (continuous line) of the diffractive optical element (transmission grating) of the optical head of the fifth embodiment.

As shown in FIG. 7, in the case of this embodiment, a reflection grating having a structure in which a reflection layer 16 is formed on the surface is provided for the bottom face of the refractive optical means 9a serving as a prism. By integrating the grating with the means 9a, the structure is stabilized. Particularly because the reflection layer is formed on the relief surface, an advantage is obtained that the reflection layer also serves as a protective layer.

The reflection grating 5d has a blazed shape or stepped shape (multilevel) having a groove depth of, for example, 0.22 μm and the optimum groove depth is decreased to approx. ⅙ compared to the case of a transmission diffractive optical element. Therefore, the etching time under fabrication is decreased, the amount of sag of cross section decreases, and fabrication is simplified. Moreover, as shown in FIG. 8, the value of the 1st-order diffraction efficiency can be improved compared to the case of the transmission grating.
(Seventh Embodiment)

The optical head of the seventh embodiment of the present invention is described below mainly on points different from the case of the fifth embodiment by referring to FIGS. 9(a) and 9(b) and FIGS. 10(a) and 10(b).

Figure 10A:
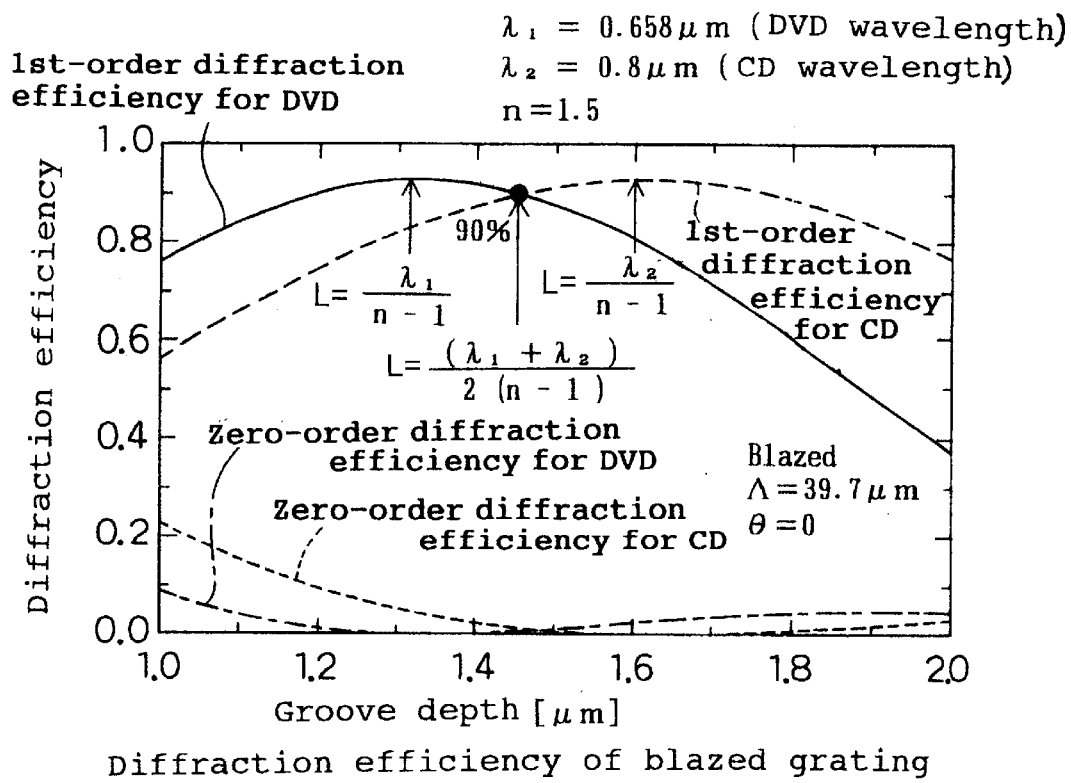
FIG. 10($a$) is a graph showing the relation between diffraction efficiency and groove depth when using a blazed grating having a sawtooth cross section as the diffractive optical element of the optical head of the seventh embodiment of the present invention.
Figure 10B:
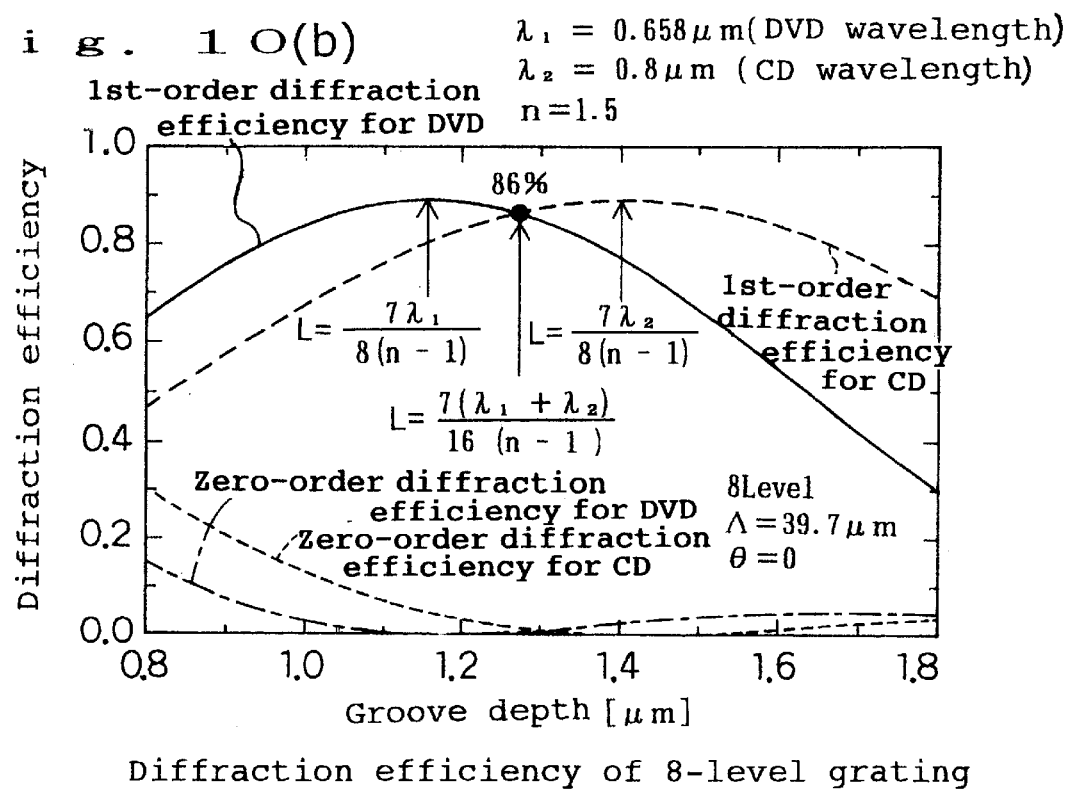

FIG. 9(a) is a side view showing the basic configuration and light propagation state of the optical head of the seventh embodiment of the present invention and FIG. 9(b) is a top view showing the basic configuration and light propagation state of the optical head of the seventh embodiment of the present invention. FIG. 10(a) is a graph sowing the relation between diffraction efficiency and groove depth when using a blazed grating having a saw-tooth cross section as the diffractive optical element of the optical head of the seventh embodiment of the present invention and FIG. 10(b) is a graph showing the relation between diffraction efficiency and groove depth when using an eight-level grating having an eight-step cross section (refer to FIG. 2(b)) as the diffractive optical element of the optical head of the seventh embodiment of the present invention.

The optical head of this embodiment has two-wavelength configuration. That is, the configuration includes a semiconductor laser light source 1a having, for example, a wavelength $\lambda_1$=0.658 μm for a DVD 11a and a semiconductor laser light source 1b having, for example, a wavelength $\lambda_2$=0.80 μm for a CD-R or CD 11b, in which the both wavelengths are multiplexed or separated by a beam splitter 18. The beam splitter 18 can use any splitter as long as it is an element capable of multiplexing or separating wavelengths such as a wedge prism. The light sources 1a and 1b are respectively set in light-source-and-photodetector modules 17a and 17b.

The diffractive optical element 5c integrated with the side face of the refractive optical means 9a serving as a prism is illuminated by two wavelengths $\lambda_1$ and $\lambda_2$.

When a blazed grating is used as the diffractive optical element 5c, a wavelength is equal to $\lambda_1$, and a groove depth L is equal to $\lambda_1/(n-1)$, the 1st-order diffraction efficiency has the maximum value as shown by the continuous line in FIG. 10(a). Further, when a wavelength is equal to $\lambda_2$, and a groove depth L is equal to $\lambda_2/(n-1)$, the 1st-order diffraction efficiency has the maximum value as shown by the broken line in FIG. 10(a). It is found by the present inventor et al.

that a high diffraction efficiency of 80% or more can be realized for the wavelengths $\lambda_1$ and $\lambda_2$ when a groove depth meets an inequality $\lambda_1/(n-1) \leq L \leq \lambda_2/(n-1)$. Moreover, it is found that, particularly when L is approximately equal to $(\lambda_1+\lambda_2)/[2(n-1)]$, the diffraction efficiency has almost the same value for the both wavelengths and efficiency balance becomes most preferable.

Furthermore, as shown in FIG. 10(b), it is found that a high diffraction efficiency can be realized for the both wavelengths when the cross section has a multilevel shape with p levels and the groove depth meets an inequality $(p-1) \cdot \lambda_1/[p \cdot (n-1)] \leq L \leq (p-1) \cdot \lambda_2/[p \cdot (n-1)]$ and most preferable balance is obtained particularly when L is approximately equal to $(p-1) \cdot (\lambda_1+\lambda_2)/[2p(n-1)]$.

FIG. 10(b) is an illustration showing the relation between diffraction efficiency and groove depth when using a grating whose cross section has an 8-level structure. In FIG. 10(b), when the wavelength is equal to $\lambda_1$ and the groove depth L is equal to $7\lambda_1/8(n-1)$, the 1st-order diffraction efficiency has the maximum value as shown by the continuous line. Moreover, when the wavelength is equal to $\lambda_2$ and the groove depth L is equal to $7\lambda_2/8(n-1)$, the 1st-order diffraction efficiency has the maximum value as shown by the broken line.

For this embodiment, a case of two wavelengths is described. However, it is possible to use a configuration corresponding to three wavelengths or more. For example, in the case of corresponding to three wavelengths or more when adding blue and green wavelengths of 0.35 to 0.50 μm, the above result can be applied. That is, by assuming the minimum value of wavelengths as $\lambda_1$ and the maximum value of them as $\lambda_2$ and thereby applying the above expression, it is possible to raise the 1st-order diffraction efficiency of a diffractive optical element for a plurality of wavelengths. For example, it is possible to constitute an optical head capable of preferably reading data from various optical disks such as a high-density optical disk of 10 Gbytes or more, DVD, DVD-R, CD, and CD-R.

(Eighth Embodiment)

The optical head of the eighth embodiment of the present invention is described below mainly on points different from the case of the fifth embodiment by referring to FIGS. 11 and 12.

Figure 11:
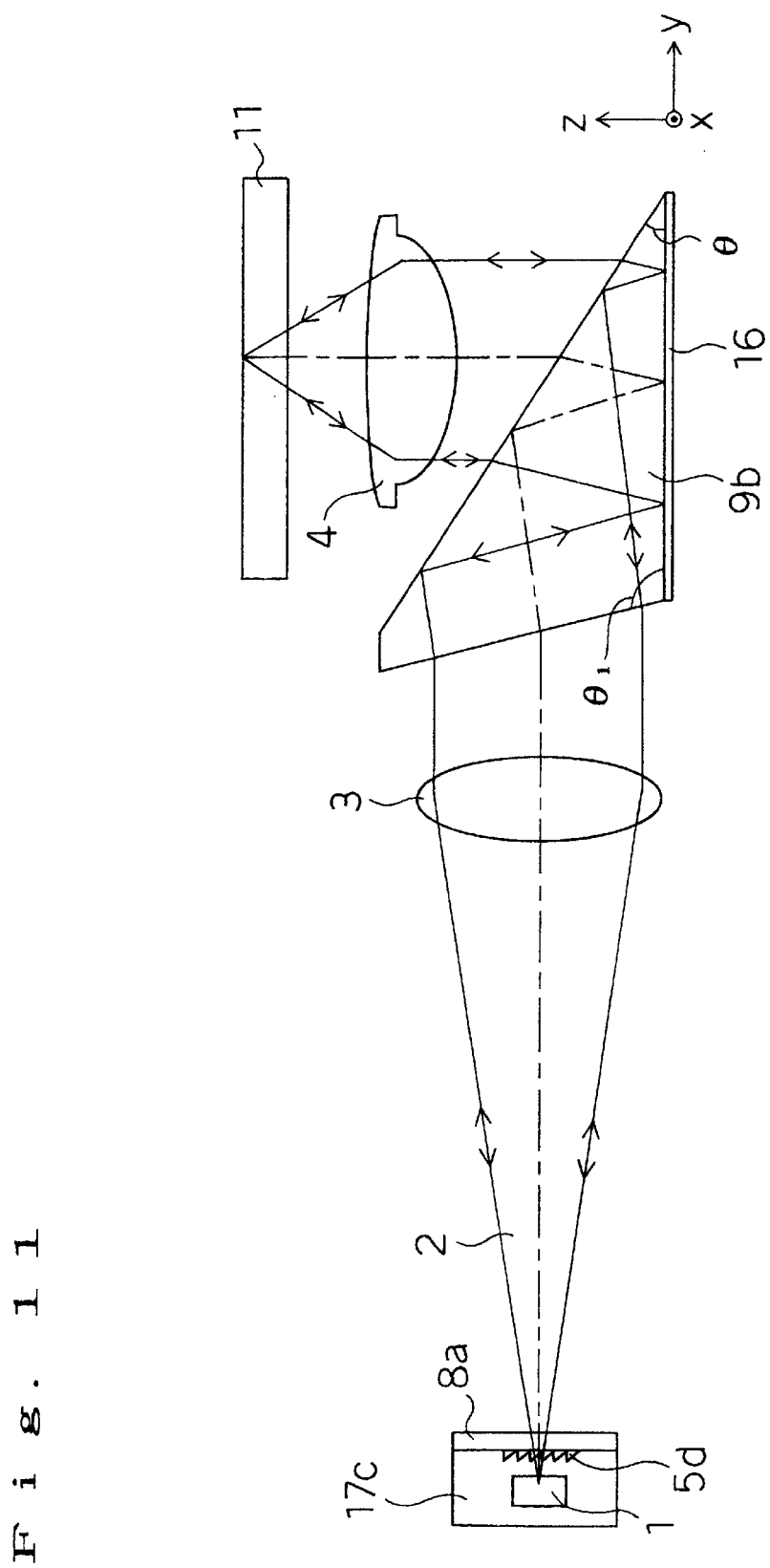
FIG. 11 is a side view showing the basic configuration and light propagation state of the optical head of the eighth embodiment of the present invention.
Figure 12:
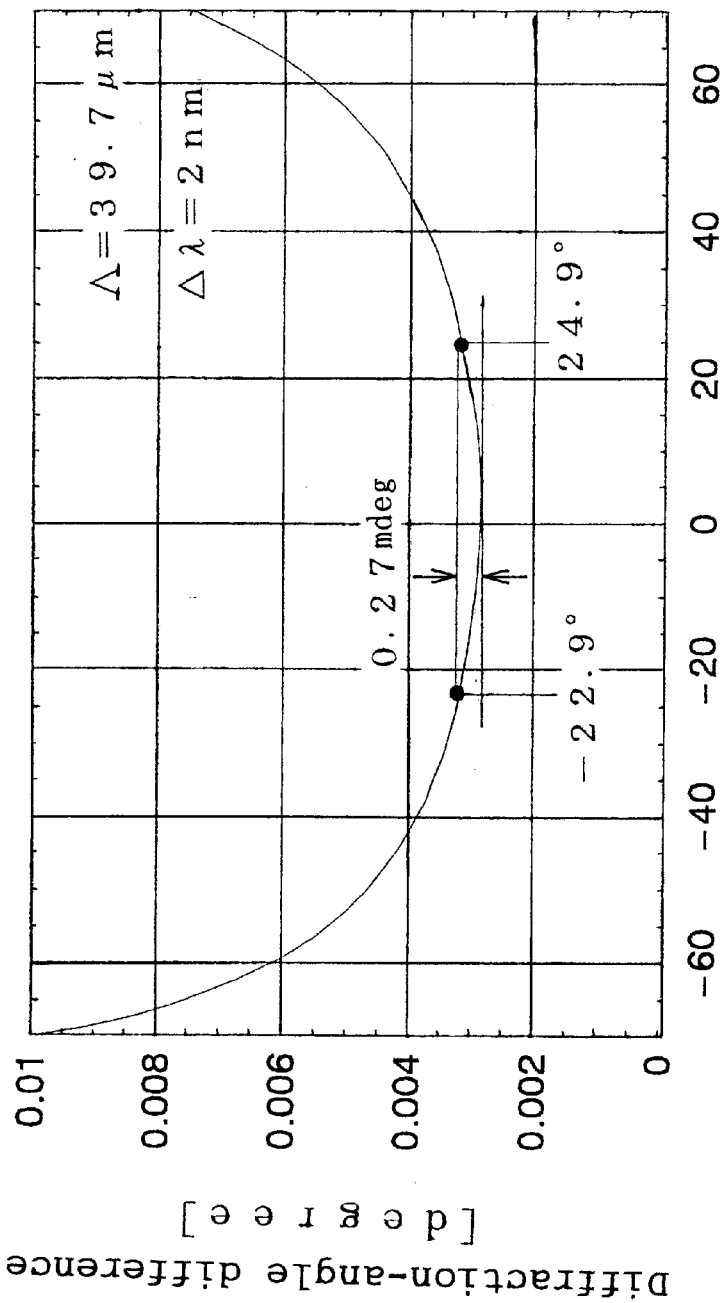
FIG. 12 is an illustration showing the relation between diffraction-angle difference and incident angle of 1st-order diffracted light when two wavelengths 2 nm different from each other enter the diffractive optical element of the optical head of the eighth embodiment of the present invention at the same incident angle.

FIG. 11 is a side view showing the basic configuration and light propagation state of the optical head of the eighth embodiment of the present invention and FIG. 12 is an illustration showing the relation between diffraction angle difference and incident angle of 1st-order diffracted light when applying two wavelengths different from each other by 2 nm to the diffractive optical element 5d (grating having a period Λ=39.7 μm) of the optical head of the eighth embodiment of the present invention at the same incident angle.

As shown in FIG. 11, the optical head of this embodiment uses a prism 9b of θ=33° and $\theta_1$=123° as a refractive optical element and a uniform-period grating 5d having a period of 39.7 μm as the diffractive optical element 5d. The grating 5d is integrated with a focus/track error signal detecting optical element 8a and set to the sealing window of a light-source-and-photodetector unit 17c serving as a divergent-light optical path nearby a light source 1. The grating 5d, as illustrated, is set by making the groove face the light source 1 so as to prevent the groove from being damaged. However, it is possible to perform operations even by inversely setting it. The focus/track error signal detecting optical element 8a uses a polarizing holographic optical element made of UV-curing liquid crystal and a quarter-wave plate is integrated with the surface of the holographic optical element.

By integrating the grating 5d with the focus/track error signal detecting optical element 8a, the structure is stabilized, they can be handled as one component, and alignment can be easily made. Moreover, by setting the grating 5d to an optical path nearby the light source 1, it is possible to greatly decrease the area of the diffractive optical element 5d and reduce the cost.

The wavelength width of the light source 1 is typically spread by approx. 2 nm due to high-frequency superimposition. As shown in FIG. 12, it is found by the present inventor et al. that the diffraction-angle difference of 1st-order diffracted light increases as the incident angle of the light (always having a wavelength spread of 2 nm) coming into the grating 5d deviates (diagonal incidence) from 0° (vertical incidence). That is, when parallel rays enter a uniform-period grating, the chromatic-aberration correcting effect is the same for the entire beam region. However, when divergent light or convergent light enters the uniform-period grating, dispersion further intensifies as rays are tilted. That is, in the case of vertical incidence of an optical axis, the chromatic-aberration correcting effect intensifies at the peripheral portion compared to the central portion.

As the result of more detailed study, the fact that a diffraction-angle difference of 0.001° is produced corresponds to the fact that a y-axial distance is separated to 37 nm on the optical disk 11 when using an objective lens having a focal distance of 2.14 mm (chromatic-aberration). Because a y-axial distance which does not matter on chromatic-aberration is equal to approx. 10 nm, it is found that the diffraction-angle difference corresponds to 0.27 mdeg and therefore, an incident angle must be kept at 22.9° or less. This is a value corresponding to a numerical aperture NA of 0.39.

In the case of this embodiment, because NA of divergent light 2 (NA of the collimator lens 3) is equal to 0.3, there is no problem on chromatic-aberration and thus, a preferable spot is obtained.

(Ninth Embodiment)

The optical head of the ninth embodiment of the present invention is described below mainly on points different from the case of the eighth embodiment by referring to FIGS. 13(a) and 13(b).

FIG. 13(a) is a side view showing the basic configuration and light propagation state of the optical head of the ninth embodiment of the present invention and FIG. 13(b) is a top view showing the basic configuration and light propagation state of the optical head of the ninth embodiment of the present invention.

The optical head of this embodiment has two-wavelength configuration. That is, the configuration includes a semiconductor-laser light source 1a having, for example, a wavelength $\lambda_1$=0.658 μm for a DVD and a semiconductor-laser light source 1b having, for example, a wavelength $\lambda_2$=0.80 μm for a CD-R and a CD. The light sources 1a and 1b are respectively set in light-source-and-photodetector modules 17c and 17d.

It is found by the present inventor et al. that a light source with shorter wavelength is further subject to the chromatic-aberration of a condensed spot because the pit size on the optical disk 11 decreases. Therefore, in the case of this embodiment, the diffractive optical element 5d is set only to an optical path nearby the light source 1a of the small wavelength $\lambda_1$ and a condensed spot free from chromatic aberration is obtained at the wavelength $\lambda_1$. As for the large wavelength is $\lambda_2$, a configuration is used in which a chromatic-aberration correcting grating is not included. As for wavelength $\lambda_2$, however, the optical head operates with no problem even if a slight chromatic-aberration occurs and the cost is reduced by the above configuration.

Moreover, a focus/track error signal detecting optical element 8b is set to the sealing window of the light-source-and-photodetector unit 17d in an optical path nearby the long-wavelength light source 1b.

Then, another example of this embodiment using a blue-wavelength light source as the light source 1a is described below by referring to FIG. 14.

Figure 14:
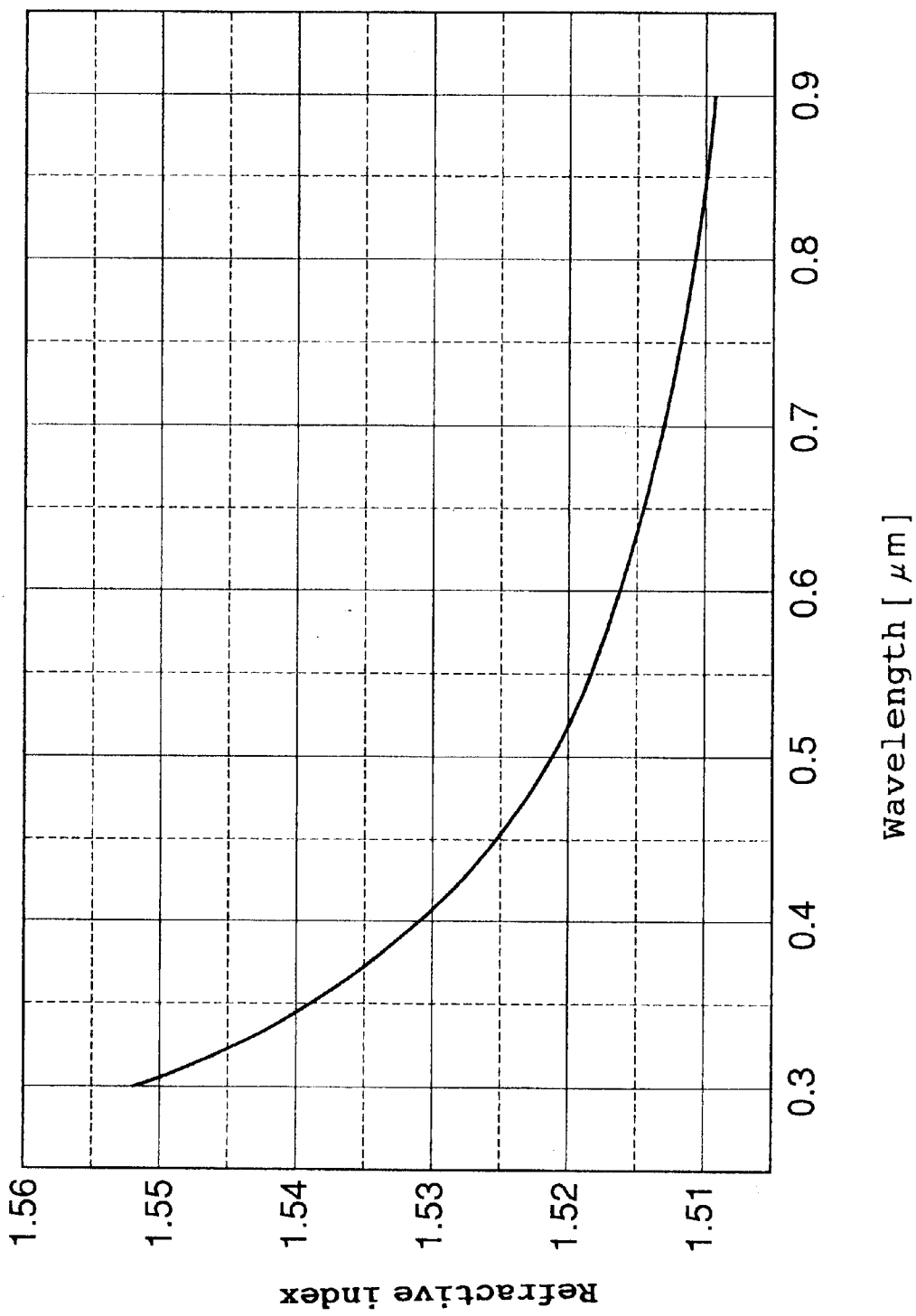
FIG. 14 is an illustration showing the wavelength dependency of the refractive index of transparent material (BK7 glass)

FIG. 14 is an illustration showing the wavelength dependency of the refractive index of transparent material (BK7 glass).

As shown in FIG. 14, when a wavelength becomes approx. 0.5 µm or less, chromatic dispersion showing a refractive-index change value (differential value of the refractive-index curve in FIG. 14) of the transparent material of the refractive optical means 9a suddenly increases. For example, in the case of a wavelength λ=0.4 µm, it is found that chromatic dispersion four times larger than the chromatic dispersion for λ=0.658 µm is shown. For example, in the case of λ=0.4 µm, the period of the grating 5d is ¼ the period for λ=0.658 µm, that is, approx. 10 µm.

As for a wavelength in a region of 0.5 µm or less, because chromatic dispersion is large as described above, the refraction-angle change of the refracted light emitted from the refractive optical means 9a becomes very large also for a slight wavelength fluctuation and thereby, an optical characteristic is greatly deteriorated. Therefore, the advantage of the present invention that the refraction-angle change is canceled by the diffracted light emitted from the diffractive optical element 5d is significant.

Figure 18:
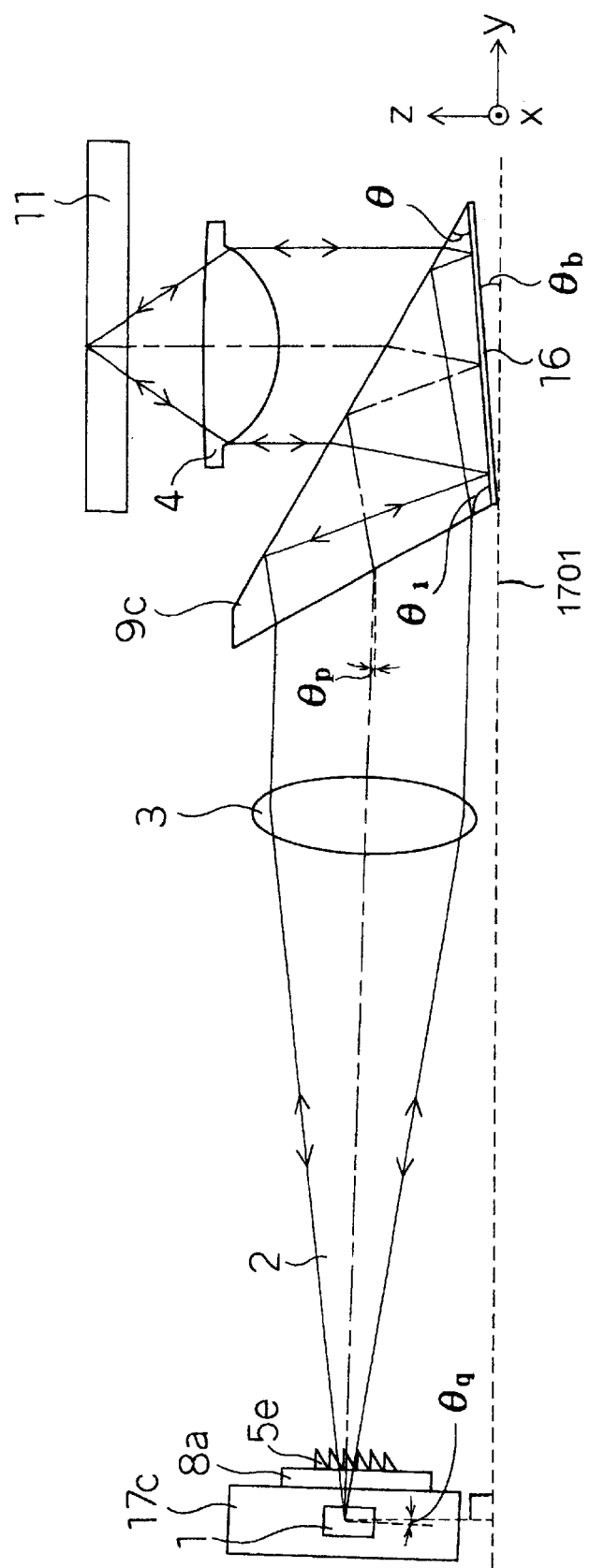
FIG. 18 is a side view showing the basic configuration and light propagation state of the optical head of an embodiment of the present invention.
Figure 19:
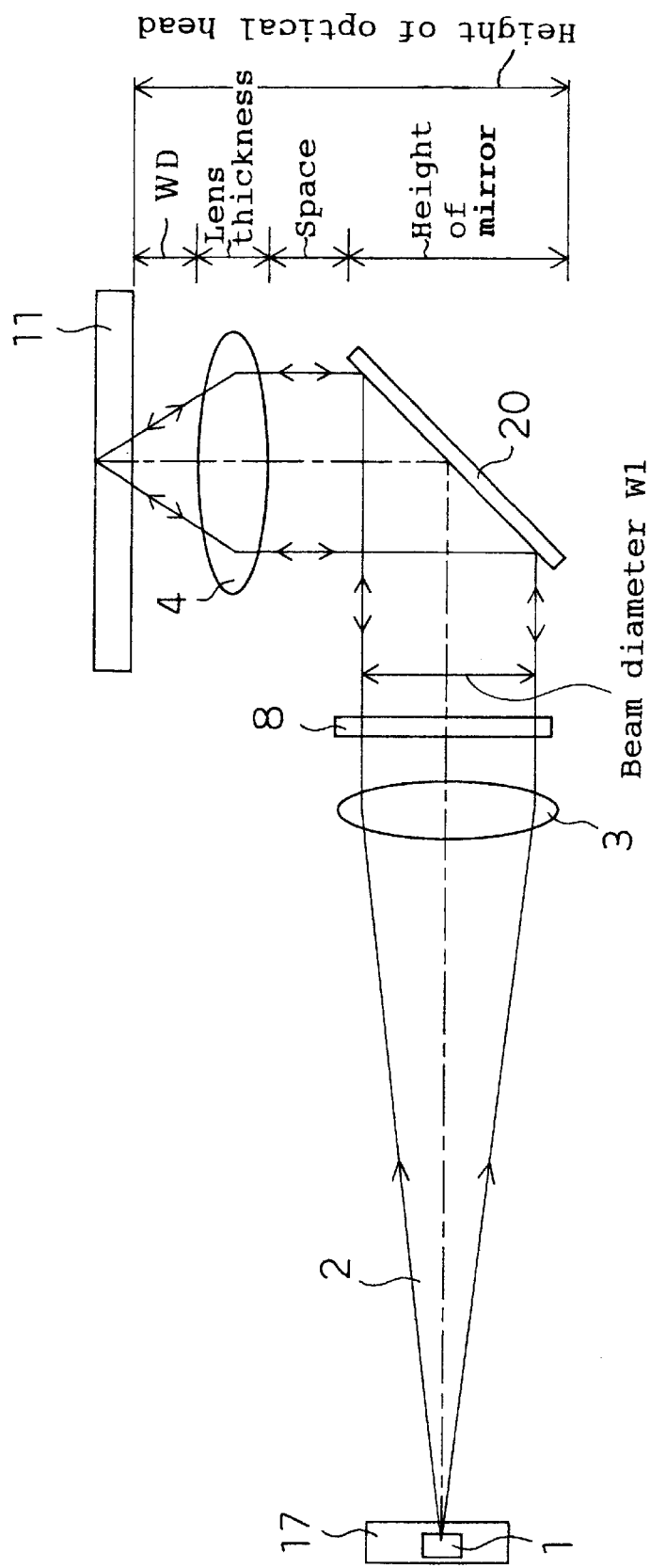
FIG. 19 is a side view showing the configuration of a conventional optical head.

Moreover, the above mentioned is effective not only for two wavelengths but also for one wavelength as long as a light source of λ=0.5 µm or less is included (for example, refer to FIG. 18). However, when a wavelength further decreases, transmittance of transparent materials is reduced due to absorption. Therefore, a wavelength range of 0.35 µm≦λ≦0.5 µm is preferable.

(Tenth Embodiment)

The optical head of the tenth embodiment of the present invention is described below mainly on points different from the case of the first embodiment by referring to FIGS. 15 and 16.

Figure 15:
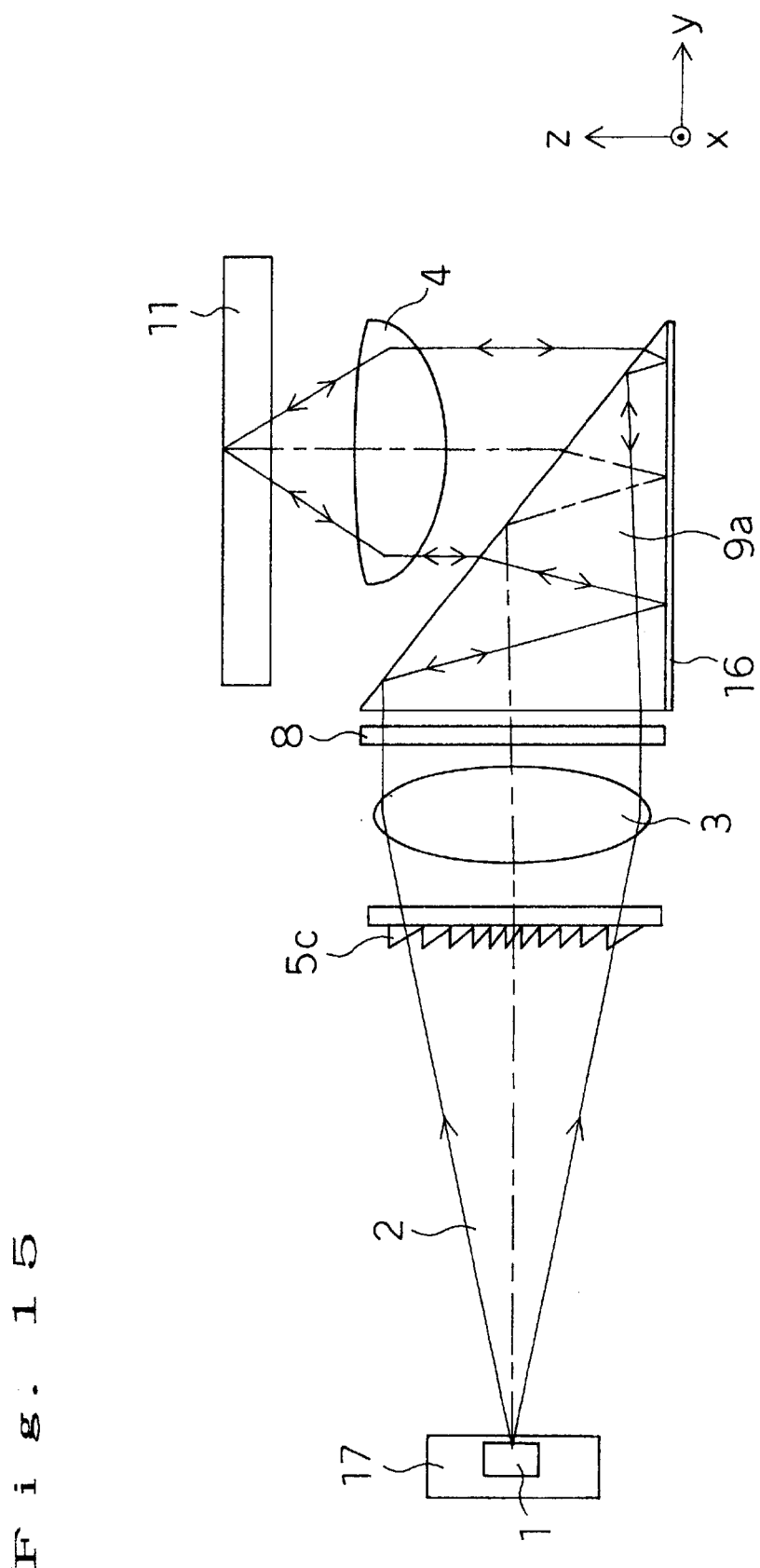
FIG. 15 is a side view showing the basic configuration and light propagation state of the optical head of the tenth embodiment of the present invention.

FIG. 15 is a side view showing the basic configuration and light propagation state of the optical head of the tenth embodiment of the present invention. FIG. 16 is a graph (vertical incidence, wavelength width Δλ=2 nm) showing the relation between period and diffraction-angle difference of 1st-order diffracted light of the diffractive optical element (grating) of the tenth embodiment of the present invention.

In the case of the optical head of this embodiment, a diffractive optical element 5c is set in the divergent optical path between a light source 1 and a collimator lens 3 (in order words, in the convergent optical path between the collimator lens 3 and a photodetector) to change z-axial period distributions in accordance with the convergent or divergent degree of incoming light. Because the optical axis of emitted light 2 is perpendicular to the diffractive optical element 5c, this embodiment is constituted so that the period is small at the central portion and increases toward the circumference. When the optical axis tilts, it is permitted to change periods in accordance with the inclination of rays coming into each region.

Figure 16:
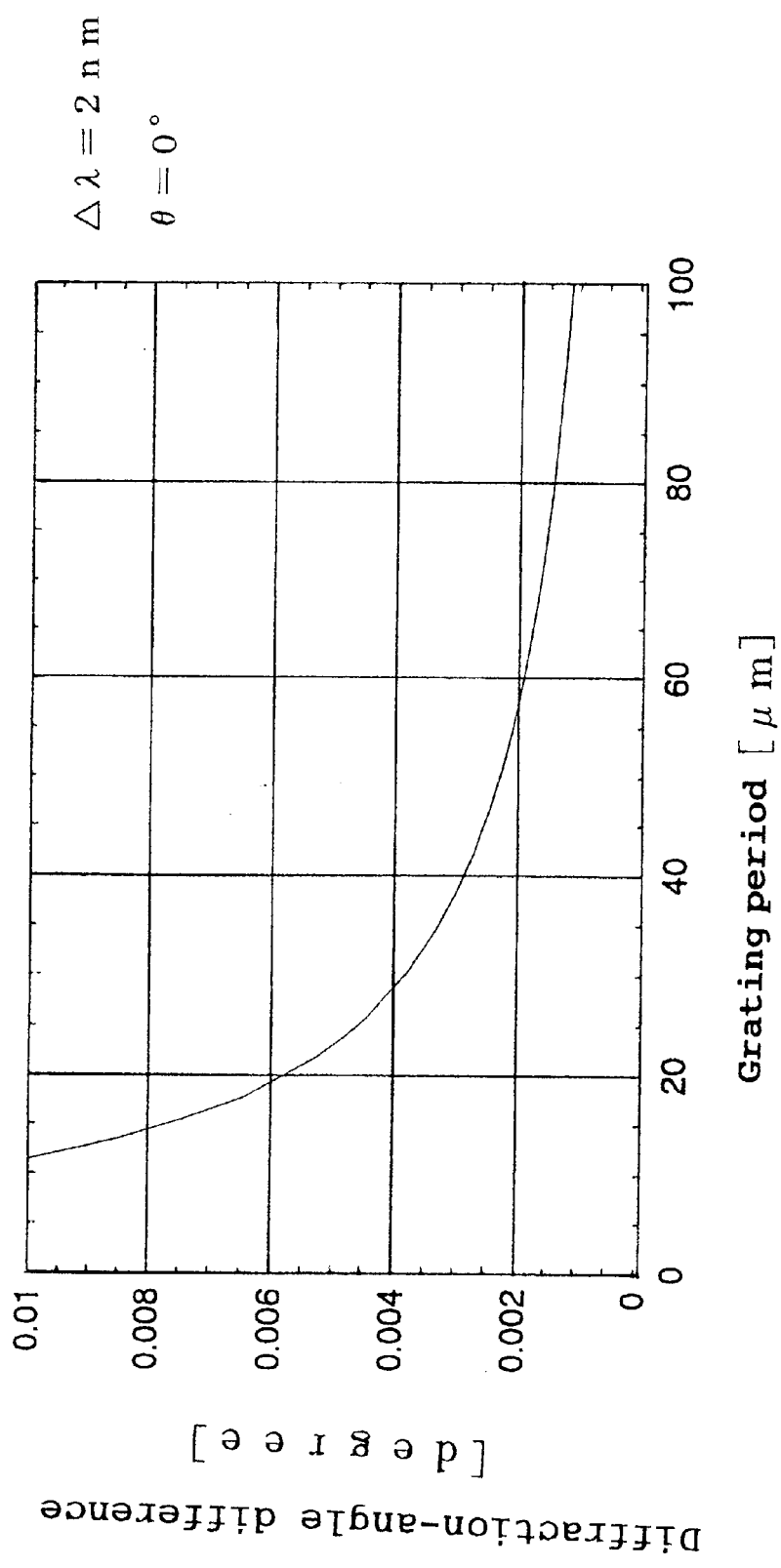
FIG. 16 is a graph (vertical incidence, wavelength width $\Delta\lambda=2$ nm) showing the relation between the period of diffractive optical element (grating) and the diffraction-angle difference of 1st-order diffracted-light of the optical head of the tenth embodiment of the present invention.

Because it is already found by the present inventor that a diffraction angle difference increases as a grating period becomes smaller as shown in FIG. 16 and a chromatic-aberration correcting effect intensifies as light comes in more diagonally as shown in FIG. 12, it is found from the above results that the diffraction-angle change value of diffracted light emitted from a diffractive optical element can be accurately uniformed over the entire surface by lengthening a period toward the circumference where light tilts.

(Eleventh Embodiment)

The optical head of the eleventh embodiment of the present invention is described below mainly on points different from the case of the first embodiment by referring to FIG. 17.

Figure 17:
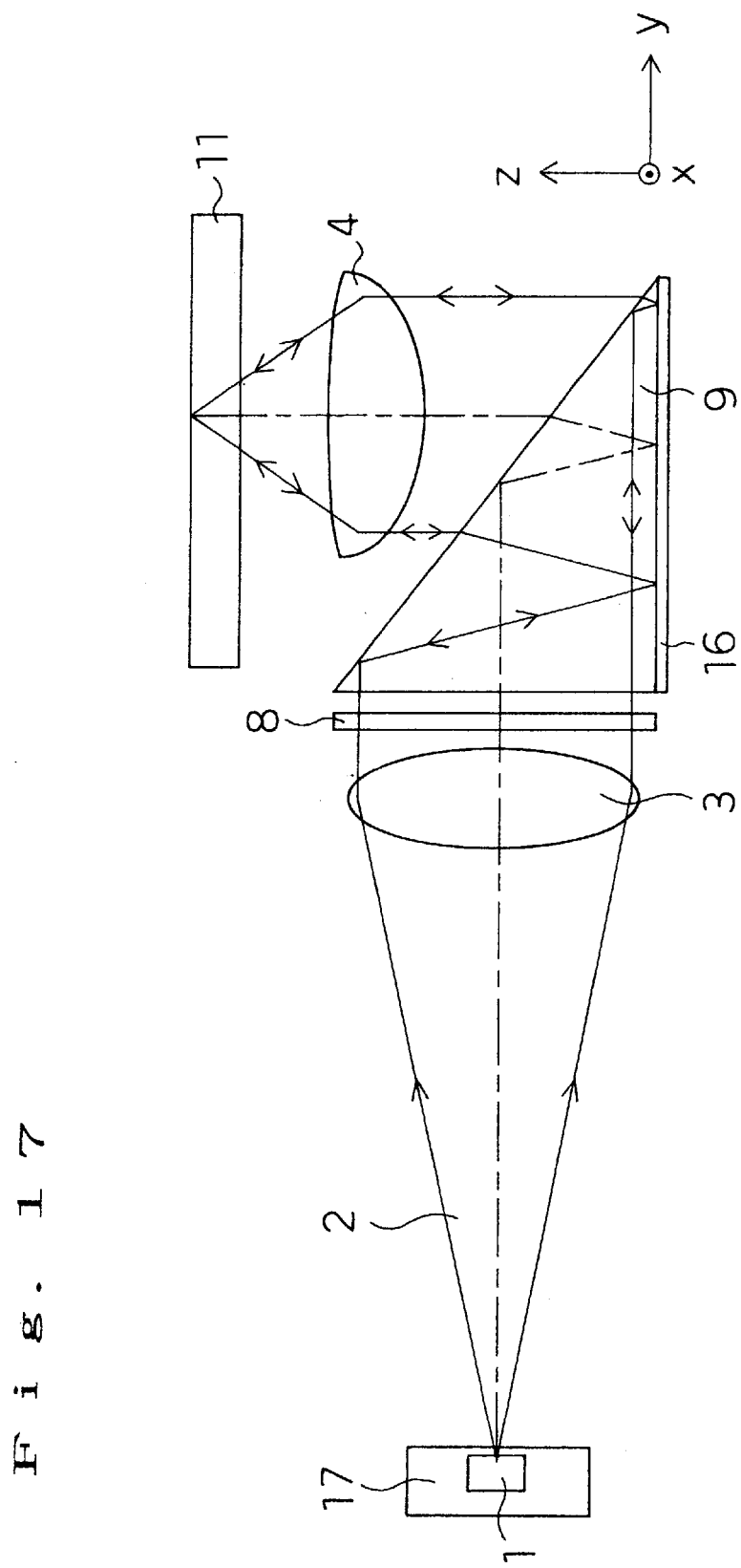
FIG. 17 is a side view showing the basic configuration and light propagation state of the optical head of the eleventh embodiment of the present invention.

FIG. 17 is a side view showing the basic configuration and light propagation state of the optical head of the eleventh embodiment of the present invention.

The optical head of this embodiment is constituted by excluding the diffractive optical element of the first embodiment. That is, the optical head has refractive optical means 9 constituted of a prism having three optical planes in the optical path between a light source 1 and an optical disk 11. The refractive optical means 9 is constituted so that, when assuming the optical disk side as a first plane, the light-source side as a second plane, and the bottom-face side as a third plane, the light emitted from the light source 1 passes through the second plane, reflects from the first plane and the second plane in order, and passes through the first plane to be emitted. Therefore, it is possible to greatly decrease the height (e.g. up to 5.3 mm) of the optical head while making the refractive optical means 9 serve as the mirror of a conventional optical head.

Because this embodiment does not include a chromatic-aberration correcting grating, chromatic-aberration becomes a problem on a small-pit optical disk such as a DVD. However, chromatic-aberration is considerably reduced by using low-dispersion glass having a large Abbe number for the transparent material of the prism 9. Moreover, because the problem of chromatic-aberration can be negligible in a large-pit optical disk such as a CD or CD-R and thereby, a thin optical head can be realized.

The first to eleventh embodiments of the present invention are described above. However, it is possible to constitute an optical head by combining the configurations of the optical heads of the embodiments in addition to the optical heads of the embodiments and it is needless to say that the same advantage can be obtained. The objective lenses and collimator lenses used to explain the embodiments are named for convenience' sake and they are the same as general lenses.

For the above embodiments, a case is described in which the angle formed between the bottom face of refractive optical means and y-axis is 0°. However, it is also possible to use the configuration tilted by an angle $\theta_b$ from the setting reference plane 1701 of the refractive optical means 9c as shown in FIG. 18. In this case, when it is assumed that the refractive optical means uses a prism made of transparent material having a refractive index n, the angle formed between an optical axis coming into the refractive optical means from a light source and the setting reference plane 1701 is equal to $\theta_p$, and the setting angle of the bottom face of the refractive optical means 9c is equal to $\theta_b$, it is assumed that one angle θ of the base angles of the prism substantially meets $\sin(\theta-\theta_b)=n\cdot\sign(4\theta-2\theta_b-\theta_p-90°-\theta')$ and $n\cdot\sin\theta'=\sin(\theta-\theta_b)$ and the other angle of the base angles substantially meets $\theta_1=\theta+90°-2\theta_b-\theta_p$. The configuration shown in FIG. 18 shows an example in which a diffractive optical element is set only in the divergent-light optical path between the light source 1 and the collimator lens 3.

Thereby, because a margin is produced in the interval between the left bottom end of the objective lens 4 and the prism 9c in FIG. 18, an advantage is shown that it is possible to generally further decrease the interval between the objective lens 4 and the prism 9c.

In FIG. 18, the specification of the prism 9c shows $\theta_b=5.0°$, $\theta=34.8°$, and $\theta_1=113.8°$ and bottom-side length= 4.4 mm and uses BK7 glass as transparent material. Moreover, the diffractive optical element 5e is used by forming the uniform-period grating 5e having a period of 42.8 μm on a glass substrate and integrally forming a holographic optical element serving as the focus/track error signal detecting optical element 8a on the back of the glass substrate (that is, the grating 5e is integrated with the focus/track error signal detecting optical element 8a) and set on the sealing window of the light-source-and-photodetector unit 17c serving as a divergent-light optical path nearby the light source 1. The grating is set so that the groove faces the collimator lens 3 as illustrated. However, operations can be performed even for the arrangement opposite to the above one. By uniting the grating 5e and the focus/track error signal detecting optical element 8a, the structure is stabilized, they can be handled as one component, and alignment is simplified. Moreover, by setting the grating 5e to an optical path nearby the light source 1, it is possible to greatly decrease the area of the diffractive optical element 5e and reduce the cost.

Furthermore, because the light emitted from the light source 1 is diffracted by, for example, 0.88° by the grating 5e in z-axis direction, the setting angle of the light source 1 is tilted by $\theta_q=1.88°$ which is the sum of 0.88° and $\theta_p$. At the same time, the collimator lens 3, grating 5e, and focus/track error signal detecting optical element 8a are tilted by $\theta_p=1.0°$.

Furthermore, though the setting angle of the prism 9c is set to, for example, 5°, it is found that a range between 2° and 10° is preferable because a sufficient margin is produced between the left bottom end of the objective lens 4 and prism 9c.

Even when the chromatic-aberration correcting grating 5e is removed from the configuration in FIG. 18, it is possible to constitute a very thin optical head if chromatic-aberration is not a very large problem similarly to the case of the optical head of the embodiment shown in FIG. 17. In this case, $\theta_q$ becomes equal to $\theta_p$.

As described above, the present invention makes it possible to realize a thin optical head having a preferable optical characteristic.

What is claimed is:

1. An optical head comprising:
   a diffractive optical element set in the optical path between a light source and an information recording medium; and
   refractive optical means which is set in the optical path and into which the optical axis of the light emitted from the light source diagonally comes; wherein
   diffraction angle change of the diffracted light emitted from the diffractive optical element due to the wavelength fluctuation of the emitted light and refraction angle change of the refracted light emitted from the refractive optical means occur in the direction in which the diffraction angle change and refraction angle change are canceled.

2. The optical head according to claim 1, wherein the diffractive optical element is integrated with the refractive optical means.

3. The optical head according to claim 1, wherein collimator means is included which changes the light emitted from the light source substantially to parallel rays and makes the parallel rays enter the diffractive optical element.

4. The optical head according to claim 1, wherein a focus/track error signal detecting optical element is set between the light source and the refractive optical means and the diffractive optical element is integrated with the focus/track error signal detecting optical element.

5. The optical head according to claim 1, wherein the diffractive optical element is a uniform-period grating.

6. The optical head according to claim 1, wherein
   the diffractive optical element is set in a convergence-light optical path or divergence-light optical path, and
   the period of the diffractive optical element differs depending on places in accordance with the convergent degree or divergent degree of the light coming into the diffractive optical element.

7. The optical head according to claim 6, wherein the period is adjusted so as to be further lengthened substantially from the central portion toward the circumferential portion of the diffractive optical element.

8. The optical head according to claim 1, wherein the diffractive optical element is set in a convergent-light optical path or divergent-light optical path having a numerical aperture of 0.39 or less and the period of the diffractive optical element is uniform.

9. The optical head according to claim 8, wherein the diffractive optical element is set in an optical path nearby the light source.

10. The optical head according to claim 1, wherein the refractive optical means is an optical element having three planes for receiving or reflecting light and the diffractive optical element is formed on at least one of the three planes of the refractive optical means.

11. The optical head according to claim 10, wherein the diffractive optical element is the reflective type and is formed on the reflective plane of the refractive optical means.

12. The optical head according to claim 1, wherein the refractive optical means is a prism made of low-dispersion transparent material having three planes for receiving or reflecting light.

13. The optical head according to claim 12, wherein the transparent material has an Abbe number of 50 or more.

14. The optical head according to claim 1, wherein
   the refractive optical means is a prism made of transparent material having a refractive index n, and
   one of the base angles of the prism is substantially a right angle and the other θ of the base angles has an angle θ substantially meeting $\theta=n\cdot\sin(3\theta-90°)$.

15. The optical head according to claim 1, wherein
   the refractive optical means is a prism made of transparent material having a refractive index n, and
   one θ of the base angles of the prism substantially meets $\sin(2\theta-45°)=1/n\cdot\sin\theta$ and the other $\theta_1$ of the base angles meets $\theta+85°\leq\theta_1\leq\theta+95°$.

16. The optical head according to claim 1, wherein the light source has a plurality of light-source sections for emitting wavelengths different from each other.

17. The optical head according to claim 16, wherein the diffractive optical element is set only to an optical path nearby a light-source section for emitting minimum-wavelength light among the light-source sections.

18. The optical head according to claim 16, wherein
   the diffractive optical element has a blazed sectional form, and
   when assuming the minimum value of the different wavelengths as $\lambda_1$ and the maximum value of them as $\lambda_2$ and the refractive index of the diffractive optical element as n, the groove depth L of the diffractive optical element meets the relation of $\lambda_1/(n-1) \leq L \leq \lambda_2/(n-1)$.

19. The optical head according to claim 18, wherein the groove depth L of the diffractive optical element is substantially equal to $(\lambda_1+\lambda_2)/[2(n-1)]$.

20. The optical head according to claim 16, wherein
    the sectional form of the diffractive optical element is a multilevel shape with p levels, and
    when assuming the minimum value of the different wavelengths as $\lambda_1$ and the maximum value of them as $\lambda_2$ and the refractive index of the diffractive optical element as n, the groove depth L of the diffractive optical element meets the relation of $(p-1)\cdot\lambda_1/[p\cdot(n-1)] \leq L \leq (p-1)\cdot\lambda_2/[p\cdot(n-1)]$.

21. The optical head according to claim 20, wherein the groove depth of the refractive optical element is substantially equal to $(p-1)\cdot(\lambda_1+\lambda_2)/[2p(n-1)]$.

22. The optical head according to claim 1, wherein
    the refractive optical element is a prism made of transparent material having a refractive index n, and
    when assuming a setting angle formed between the bottom face and the setting reference plane of the refractive optical means as $\theta_b$, and an angle formed between the light coming into the refractive optical means from the light source and the setting reference plane as $\theta_p$, one angle $\theta$ of the base angles of the prism substantially meets $\sin(\theta-\theta_b)=n\cdot\sin(4\theta-2\theta_b-\theta_p-90°-\theta')$ and $n\cdot\sin\theta'=\sin(\theta-\theta_b)$ and the other angle $\theta_1$ of the base angles substantially meets $\theta_1=\theta+90°-2\theta_b-\theta_p$.

23. The optical head according to claim 22, wherein the $\theta_b$ substantially meets $2° \leq \theta_b \leq 10°$.

24. The optical head according to claim 1, wherein
    the refractive optical means is a prism having three optical panes, and
    when assuming one of the three planes at the information recording medium side as a first plane, one of them at the light-source side as a second plane, and remaining one of them as a third plane, the light emitted from the light source passes through the second plane, reflects on the first and third planes in order, and passes through the first plane.

25. The optical head according to claim 24, wherein an objective lens is set in the optical path between the information recording medium and the refractive optical means, and
    the height of the uppermost portion of the emitted light passing through the second plane from the setting reference plane of the refractive optical means is higher than the height of the lowermost portion of the objective lens from the setting reference plane.

26. The optical head according to claim 1, wherein the wavelength $\lambda$ of the emitted light substantially meets $0.35 \mu m \leq \lambda \leq 0.5 \mu m$.

* * * * *

UNITED STATES PATENT AND TRADEMARK OFFICE
CERTIFICATE OF CORRECTION

PATENT NO.    : 6,414,930 B1
DATED         : July 2, 2002
INVENTOR(S)   : Shiono et al.

It is certified that error appears in the above-identified patent and that said Letters Patent is hereby corrected as shown below:

<u>Column 20,</u>
Line 7, "panes" should read -- planes --.

Signed and Sealed this

Fourth Day of March, 2003

JAMES E. ROGAN
*Director of the United States Patent and Trademark Office*